United States Patent
Gonzalez

(10) Patent No.: US 9,732,791 B1
(45) Date of Patent: Aug. 15, 2017

(54) BEARING ASSEMBLIES INCLUDING TILTING BEARING ELEMENTS AND SUPERHARD SLIDING BEARING ELEMENTS, BEARING ASSEMBLIES INCLUDING A SUBSTANTIALLY CONTINUOUS BEARING ELEMENT AND SUPERHARD SLIDING BEARING ELEMENTS, AND RELATED BEARING APPARATUSES AND METHODS

(71) Applicant: US Synthetic Corporation, Orem, UT (US)

(72) Inventor: Jair J. Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 85 days.

(21) Appl. No.: 14/631,596

(22) Filed: Feb. 25, 2015

(51) Int. Cl.
| F16C 17/06 | (2006.01) |
| E21B 4/00 | (2006.01) |
| F16C 33/04 | (2006.01) |
| F16C 33/26 | (2006.01) |

(52) U.S. Cl.
CPC ............ *F16C 17/06* (2013.01); *F16C 33/043* (2013.01); *F16C 33/26* (2013.01); *E21B 4/003* (2013.01); *F16C 2352/00* (2013.01)

(58) Field of Classification Search
CPC ........ F16C 17/03; F16C 17/035; F16C 17/06; F16C 17/065; F16C 33/043; F16C 33/26; F16C 2206/04; F16C 2352/00; E21B 4/003; E21B 10/22; E21B 10/23
See application file for complete search history.

(56) References Cited

U.S. PATENT DOCUMENTS

| 3,639,014 A | * | 2/1972 | Sixsmith | F16C 17/035 384/114 |
| 3,784,265 A | * | 1/1974 | Cornford | F16C 13/04 384/310 |
| 4,854,401 A | * | 8/1989 | Kruger | E21B 4/003 175/107 |
| 5,125,754 A | * | 6/1992 | Ide | F16C 17/035 384/122 |
| 5,393,145 A | * | 2/1995 | Ide | F16C 17/035 384/124 |

(Continued)

OTHER PUBLICATIONS

U.S. Appl. No. 13/734,354, filed Jan. 4, 2013, Linford et al.

(Continued)

*Primary Examiner* — Alan B Waits
(74) *Attorney, Agent, or Firm* — Holland & Hart LLP

(57) ABSTRACT

Bearing assemblies and bearing apparatuses are disclosed. In an embodiment, a first bearing assembly includes tilting pads and a first plurality of sliding superhard bearing elements secured to a first support ring. In an embodiment, a second bearing assembly includes a substantially continuous bearing element secured to a second support ring. In an embodiment, a bearing apparatus includes the first bearing assembly and the second bearing assembly, with the substantially continuous bearing element generally facing the tilting pads. At relatively low rotational speeds, the first plurality of superhard bearing elements supports at least a portion of a load exerted on the bearing assembly. At relatively high rotational speeds, the tilting pads support at least a majority of the load.

32 Claims, 16 Drawing Sheets

(56) References Cited

U.S. PATENT DOCUMENTS

| | | | | |
|---|---|---|---|---|
| 5,513,917 A * | 5/1996 | Ide | ........................ | F01D 25/164 384/100 |
| 5,586,611 A * | 12/1996 | Dorosz | .................. | F16C 33/04 175/369 |
| 5,772,334 A * | 6/1998 | Parkins | ................. | F16C 17/035 384/117 |
| 5,813,480 A * | 9/1998 | Zaleski, Jr. | ............. | E21B 10/08 175/40 |
| 5,927,860 A * | 7/1999 | Buse | ....................... | F16C 17/04 384/122 |
| 6,571,886 B1 * | 6/2003 | Sullivan | ................. | E21B 10/08 175/40 |
| 7,306,059 B2 * | 12/2007 | Ide | ......................... | E21B 4/003 175/107 |
| 7,695,194 B2 * | 4/2010 | Bouru | .................... | F16C 17/03 384/222 |
| 7,708,086 B2 * | 5/2010 | Witte | ...................... | E21B 4/003 175/107 |
| 8,277,124 B2 * | 10/2012 | Sexton | ................... | E21B 4/003 384/285 |
| 8,480,304 B1 * | 7/2013 | Cooley | ................. | F16C 33/043 384/282 |
| 8,545,103 B1 * | 10/2013 | Cooley | ................. | F16C 17/03 384/306 |
| 8,613,554 B2 * | 12/2013 | Tessier | ................... | F16C 17/03 384/203 |
| 8,651,743 B2 * | 2/2014 | Peterson | ................. | F16C 17/06 384/306 |
| 8,657,498 B2 * | 2/2014 | Cooley | ................. | F16C 17/028 384/286 |
| 8,672,550 B1 * | 3/2014 | Peterson | ................. | F16C 37/00 384/282 |
| 8,789,281 B1 * | 7/2014 | Sexton | ..................... | E21B 4/02 29/898.041 |
| 8,800,686 B2 * | 8/2014 | Sexton | ................... | E21B 4/003 175/371 |
| 8,967,872 B2 * | 3/2015 | Peterson | ................. | F16C 17/06 384/306 |
| 9,127,708 B2 * | 9/2015 | Gonzalez | ................ | F16C 17/10 |
| 9,309,923 B1 * | 4/2016 | Lingwall | ............... | F16C 33/043 |
| 2009/0097788 A1 * | 4/2009 | Cooley | ................. | E21B 4/003 384/107 |
| 2012/0037425 A1 * | 2/2012 | Sexton | ................... | E21B 4/003 175/57 |
| 2012/0255789 A1 * | 10/2012 | Cooley | .................. | E21B 4/003 175/170 |
| 2013/0004106 A1 * | 1/2013 | Wenzel | .................. | F16C 17/10 384/428 |
| 2014/0102810 A1 | 4/2014 | Peterson et al. | | |

OTHER PUBLICATIONS

U.S. Appl. No. 61/948,970, filed Mar. 6, 2014, Knuteson et al.
U.S. Appl. No. 62/002,001, filed May 22, 2014, Knuteson et al.
U.S. Appl. No. 62/087,132, filed Dec. 3, 2014, Gonzalez et al.

* cited by examiner

BEARING ASSEMBLIES INCLUDING TILTING BEARING ELEMENTS AND SUPERHARD SLIDING BEARING ELEMENTS, BEARING ASSEMBLIES INCLUDING A SUBSTANTIALLY CONTINUOUS BEARING ELEMENT AND SUPERHARD SLIDING BEARING ELEMENTS, AND RELATED BEARING APPARATUSES AND METHODS

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard diamond layer that is commonly referred to as a diamond table. The diamond table is formed and bonded to a substrate using a high-pressure/high-temperature ("HPHT") process.

A thrust-bearing apparatus includes a number of superhard bearing elements affixed to a support ring. The superhard bearing elements (e.g., a PDC bearing element) bear against other superhard bearing elements of an adjacent bearing assembly during use. Superhard bearing elements are typically brazed directly into a preformed recess formed in a support ring of a fixed-position thrust-bearing.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments of the invention are directed to bearing assemblies and bearing apparatuses that include both tilting pads and sliding bearing elements. The bearing assemblies and bearing apparatuses may be employed in motors, pumps, turbines, or other mechanical systems. At relatively low rotational speeds, the sliding superhard bearing elements may support at least a portion of a load carried by a bearing assembly while, at relatively high rotational speeds, the tilting pads may support at least a majority of a load carried by the bearing assembly. Such a configuration may help reduce the load carried by the tilting pads during start-up, stops, and periods of relatively low rotational speeds, thereby increasing the operational lifetime of the bearing assembly.

In an embodiment, a bearing assembly includes a support ring, a plurality of tilting pads, and a plurality of sliding superhard bearing elements. The plurality of tilting pads are distributed circumferentially about an axis. Each of the plurality of tilting pads is tilted and/or tiltably secured to the support ring. The plurality of sliding superhard bearing elements are also distributed circumferentially about the axis and are secured to the support ring. The plurality of tilting pads and the plurality of sliding superhard bearing elements are radially spaced from each other.

In an embodiment, a bearing assembly includes a support ring, a substantially continuous bearing element, and a plurality of sliding superhard bearing elements. The substantially continuous bearing element extends about an axis. The plurality of sliding superhard bearing elements may be circumferentially spaced about the axis and radially spaced from the substantially continuous bearing element. Both the substantially continuous bearing element and the plurality of sliding superhard bearing elements are secured to the support ring.

In an embodiment, a bearing apparatus includes a first bearing assembly and a second bearing assembly. The first bearing assembly includes a first support ring, a plurality of tilting pads, and a first plurality of sliding superhard bearing elements. The plurality of tilting pads are distributed circumferentially about an axis. Each of the plurality of tilting pads is tilted and/or tiltably secured to the first support ring. The first plurality of sliding superhard bearing elements are also distributed circumferentially about the axis and are secured to the first support ring. The plurality of tilting pads and the first plurality of sliding superhard bearing elements are radially spaced from each other. The second bearing assembly includes a second support ring and a substantially continuous bearing element secured to the second support ring. The substantially continuous bearing element may generally face the plurality of tilting pads of the first bearing assembly. The substantially continuous bearing element also extends about the axis.

Other embodiments are directed to methods of using a bearing apparatus including a first bearing assembly and a second bearing assembly. The first bearing assembly includes a first support ring, a plurality of tilting pads secured to the first support ring, and a first plurality of sliding superhard bearing elements secured to the first support ring. The second bearing assembly includes a second support ring and a substantially continuous bearing element secured to the second support ring. The substantially continuous bearing element may generally face the plurality of tilting pads of the first bearing assembly. In operation, the first and second bearing assemblies are rotated relative to each other. At a first rotational speed, the first plurality of sliding superhard bearing elements of the first bearing assembly support at least a portion of a load exerted on the bearing assembly. At a second rotational speed that is greater than the first rotational speed, the plurality of tilting pads and the substantially continuous bearing elements support at least a majority of the load exerted on the bearing assembly.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

Figure 1A:
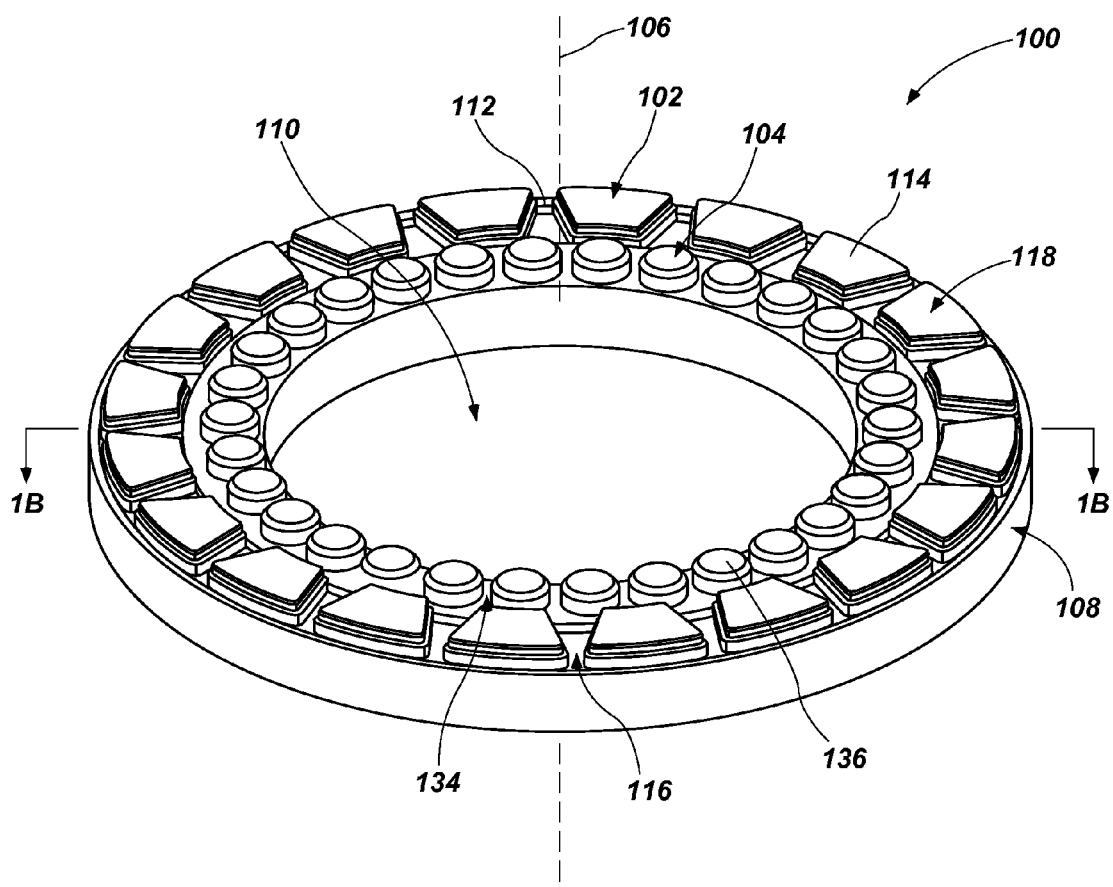
FIG. 1A is an isometric view of a thrust-bearing assembly including a plurality of tilting pads and a plurality of sliding superhard bearing elements according to an embodiment.

Embodiments of the invention are directed to bearing assemblies and bearing apparatuses including both tilting pads and sliding superhard bearing elements. At relatively low rotational speeds, the sliding superhard bearing elements may support at least a portion of a load carried by a bearing assembly while, at relatively higher rotational speeds, the tilting pads may support at least a majority of a load carried by the bearing assembly. Such a configuration may help reduce the load carried by the tilting pads during start-up, stops, and periods of relatively low rotational speeds, thereby increasing the operational lifetime of the bearing assembly.

The bearing assemblies and bearing apparatuses may be employed in subterranean drilling assemblies, pumps, compressors, turbo expanders, or other mechanical systems. Motor assemblies including at least one such bearing assembly or bearing apparatus are also disclosed, as well as methods of fabricating and using such bearing assemblies and bearing apparatuses.

As will be discussed in more detail below, in one or more embodiments, a bearing apparatus includes a first bearing assembly and a second bearing assembly. The first bearing assembly includes a first support ring having a plurality of tilting pads and a first plurality of sliding superhard bearing elements secured thereto. The second bearing assembly includes a second support ring and a substantially continuous bearing element secured to the second support ring. In some embodiments, the second bearing assembly may include a second plurality of sliding superhard bearing element secured to the second support ring. Each of the first plurality of sliding superhard bearing elements and the plurality of tilting pads may include a superhard bearing surface.

In an embodiment, the bearing apparatus includes a stator and a rotor. The first bearing assembly may be either the stator or the rotor, while the second bearing assembly may be the other of the stator or rotor. The bearing apparatus may be configured such that the bearing surfaces of plurality of tilting pads generally face the bearing surface of the substantially continuous bearing element. Additionally, the superhard bearing surfaces of the first plurality of sliding superhard bearing elements may generally face the superhard bearing surfaces of the second plurality of sliding superhard bearing elements. The bearing apparatus may be configured such that the plurality of tilting pads and the substantially continuous bearing element may support at least a majority (e.g., substantially the entire) of the load at relatively high rotational speeds, while the first plurality of sliding superhard bearing elements and the second plurality of sliding superhard bearing elements may support at least a majority of the load at relatively low rotational speeds. Such a configuration may help reduce the load carried by the plurality of tilting pads during start-up, stops, and periods of relatively low rotational speeds, thereby increasing the operational lifetime of the bearing apparatus.

While the description herein provides examples relative to a subterranean drilling and motor assembly, the bearing assembly and apparatus embodiments disclosed herein may be used in any number of applications. For example, the bearing assemblies and apparatuses may be used in a pump, turbine bearing apparatus, motor, compressor, generator, gearbox, and other systems and apparatuses, or in any combination of the foregoing. Furthermore, the bearing assemblies and apparatuses may also be operated in hydrodynamic, or mixed-mode or boundary (e.g., rubbing or sliding) lubrication regimes, if desired or needed.

Figure 1B:
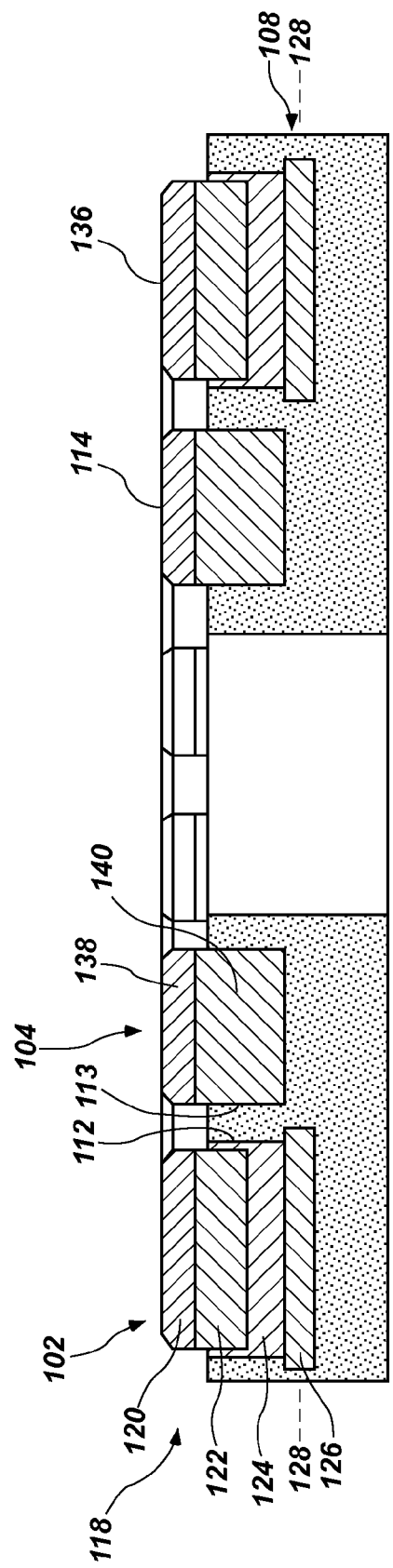
FIG. 1B is a side cross-sectional view taken along line 1B-1B of the thrust-bearing assembly shown in FIG. 1A.

FIGS. 1A and 1B are isometric and side cross-sectional views, respectively, of an embodiment of a thrust-bearing assembly 100 including a plurality of tilting pads 102 and a plurality of sliding superhard bearing elements 104. The tilting pads 102 and the sliding superhard bearing elements 104 are distributed circumferentially about a thrust axis 106 along which a thrust force may be generally directed during use and radially spaced from each other. The thrust-bearing assembly 100 may form a stator or a rotor of a thrust-bearing apparatus.

The thrust-bearing assembly 100 may include a support ring 108 defining an opening 110 through which a shaft (not shown) may extend. Each of the plurality of tilting pads 102 may be tilted and/or tiltably secured to the support ring 108. The support ring 108 may be made from a variety of different materials. For example, the support ring 108 may comprise a metal, a metal alloy, alloy steel, carbon steel, stainless steel, tungsten carbide, any other suitable metal or conductive or non-conductive material, or combinations thereof.

The support ring 108 may include one or more rows of recesses, holes, slots, channels, grooves, or apertures formed therein that are radially spaced from each other. For example, in the illustrated embodiment, the support ring 108 may include one or more annular slots 112 formed therein configured to receive the plurality of tilting pads 102. Similarly, the support ring 108 may include one or more rows of recesses 113 formed therein each configured to receive a corresponding one the plurality of sliding superhard bearing elements 104. The one or more annular slots 112 and the one or more rows of recesses 113 may be radially spaced from each other. In an embodiment, the one or more annular slots 112 may be replaced with a plurality of slots each of which receives the plurality of tilting pads 102 therein.

Each tilting pad 102 may be located circumferentially adjacent to another tilting pad 102, with a circumferential space 116 or other offset therebetween. For example, the circumferential space 116 may be spaced from an adjacent tilting pad 102 by a distance of about 2.0 mm to about 20.0 mm, or more particularly a distance of about 3.5 mm to about 15 mm, although the distance may be greater or smaller. For example, as the size of the thrust-bearing assembly 100 increases, the size of the tilting pads 102 and/or the size of the circumferential space 116 may also increase. For example, the tilting pads 102 may exhibit a nominal radial width less than about 3 inches, such as less than about 2 inches, less than about 1 inch, less than 0.5 inches, about 0.25 inches to about 0.5 inches, about 0.5 inches to about 1 inch, or about 1 inch to about 2 inch. In other embodiments, the tilting pads 102 may exhibit a nominal radial width greater than about 3 inches. In some embodiments, the tilting pads 102 may include superhard bearing elements that, in some embodiments, may exhibit a peripherally extending edge chamfer. However, in other embodiments, the edge chamfer may be omitted. A pivotal connection may be used to secure the tilting pads 102 to and/or within the support ring 108, although any other suitable securement or attachment mechanism may also be utilized. In other embodiments, tilting pads may include steel, other metals or alloys, or any other suitable material.

In the illustrated embodiment, the thrust-bearing assembly 100 includes 20 tilting pads. In other embodiments, more or less than 20 tilting pads may be used in the thrust-bearing assembly 100. For example, the thrust-bearing assembly 100 may include 3 to 20 tilting pads, such as 3 to 6, 5 to 12, 10 to 18, or 15 to 20 tilting pads. The number of tilting pads included in the thrust-bearing assembly 100 may be chosen based on the expected load, the size of the tilting pads 102, the size of the bearing assembly, and the expected life of the thrust-bearing assembly 100.

Each of the tilting pads 102 includes at least one superhard bearing element 118 having a superhard bearing surface 114. However, as previously noted, the tilting pads 102 may alternatively be made from a non-superhard material. Collectively, the bearing surfaces 114 of the plurality of tilting pads 102 provide a non-continuous bearing surface. In the illustrated embodiment, the bearing surface 114 may generally exhibit a truncated pie-shaped geometry or a generally trapezoidal geometry. However, in other embodiments, the bearing surface 114 may exhibit any other suitable geometry.

Each of the superhard bearing elements 118 may be formed from a variety of superhard materials. The term "superhard" means a material having a hardness at least equal to the hardness of tungsten carbide. In an embodiment, each of the superhard bearing elements 118 of the tilting pads 102 may include polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In another embodiment, each of the superhard bearing elements 118 of the tilting pads 102 may comprise reaction-bonded silicon carbide or reaction-bonded silicon nitride. The reaction-bonded silicon carbide or reaction-bonded silicon nitride may have additional materials therein. For example, the additional materials in the reaction-bonded superhard ceramic may include diamond, polycrystalline diamond, cubic boron nitride, a material exhibiting a hardness greater than the reaction-bonded ceramic or a material exhibiting a thermal conductivity greater than the reaction-bonded ceramic. Adding materials to the reaction-bonded ceramic that forms the superhard bearing elements 118 of the tilting pads 102 may increase the thermal conductivity and/or wear resistance of the superhard bearing elements 118. For example, adding diamond particles to reaction-bonded silicon carbide or reaction-bonded silicon nitride may increase the wear resistance of the superhard bearing elements 118 by more than 500%. In an embodiment, diamond may be added to the reaction-bonded ceramic in an amount less that about 80 weight % (e.g., about 80 weight % to about 50 weight %, about 50 weight % to about 25 weight %, less than about 25 weight %). Suitable reaction-bonded ceramics are commercially available from M Cubed Technologies, Inc. of Newark, Del. In an embodiment, each of the superhard bearing elements 118 of the tilting pads 102 may be formed from a single material. In other embodiments, tilting pads may not comprise superhard materials and may be formed from materials such as, steel, metal alloys, etc.

Referring to FIG. 1B, in the illustrated embodiment, the superhard bearing elements 118 of the tilting pads 102 may include a superhard table 120 defining the superhard bearing surface 114 and a substrate 122 to which the superhard table 120 is bonded. In an embodiment, the superhard bearing element 118 may comprise a polycrystalline diamond compact ("PDC") including a polycrystalline diamond ("PCD") table defining the superhard table 120 to which the substrate 122 is bonded. For example, the substrate 122 may comprise a cobalt-cemented tungsten carbide substrate bonded to a PCD table. The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of the PCD table may include a metal-solvent catalyst or a metallic infiltrant disposed therein that is infiltrated from the substrate 122 or from another source during fabrication. For example, the metal-solvent catalyst or metallic infiltrant may be selected from iron, nickel, cobalt, and alloys of the foregoing. The PCD table may further include thermally-stable diamond in which the metal-solvent catalyst or metallic infiltrant has been partially or substantially completely depleted from a selected surface or volume of the PCD table, such as via an acid leaching process. Thermally-stable PCD may also be sintered with one or more alkali metal catalysts.

For example, appropriately configured PDCs may be used as the superhard bearing elements 118 of the tilting pads 102, which may be formed in an HPHT process. For example, diamond particles may be disposed adjacent to the substrate 122, and subjected to an HPHT process to sinter the diamond particles to form the PCD table and bond the PCD table to the substrate 122, thereby forming the PDC. The temperature of the HPHT process may be at least about 1000° C. (e.g., about 1200° C. to about 1600° C.) and the cell pressure of the HPHT process may be at least 4.0 GPa (e.g., about 5.0 GPa to about 12 GPa or about 7.5 GPa to about 11 GPa) for a time sufficient to sinter the diamond particles.

The diamond particles may exhibit an average particle size of about 50 µm or less, such as about 30 µm or less, about 20 µm or less, about 10 µm to about 18 µm, or about 15 µm to about 18 µm. In some embodiments, the average particle size of the diamond particles may be about 10 µm or less, such as about 2 µm to about 5 µm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the mass of diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In one embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions.

More details about diamond particle sizes and diamond particle size distributions that may be employed are disclosed in U.S. patent application Ser. No. 13/734,354; U.S. Provisional Patent Application No. 61/948,970; and U.S. Provisional Patent Application No. 62/002,001. Each of U.S. patent application Ser. No. 13/734,354; U.S. Provisional Patent Application No. 61/948,970; and U.S. Provisional Patent Application No. 62/002,001 is incorporated herein, in its entirety, by this reference.

In an embodiment, the superhard table 120 may be integrally formed with the substrate 122. For example, the superhard table 120 may be a sintered PCD table that is integrally formed with the substrate 122. In such an embodiment, the infiltrated metal-solvent catalyst from the substrate 122 may be used to catalyze formation of diamond-to-diamond bonding between diamond grains of the superhard table 120 from diamond powder during HPHT processing. In another embodiment, the superhard table 120 may be a pre-formed superhard table that has been HPHT bonded to the substrate 122 in a second HPHT process after being initially formed in a first HPHT process. For example, the superhard table 120 may be a pre-formed PCD table that has been leached to substantially completely remove the metal-solvent catalyst used in the manufacture thereof and subsequently HPHT bonded or brazed to the substrate 122 in a separate process.

In some embodiments, the superhard table 120 may be leached to deplete a metal-solvent catalyst or a metallic infiltrant therefrom in order to enhance the thermal stability of the superhard table 120. For example, when the superhard table 120 is a PCD table, the superhard table 120 may be leached to remove at least a portion of the metal-solvent catalyst from a working region thereof to a selected depth that was used to initially sinter the diamond grains to form a leached thermally-stable region. The leached thermally-stable region may extend inwardly from the superhard bearing surface 114 to a selected depth. In an embodiment, the depth of the thermally-stable region may be about 10 µm to about 600 µm. More specifically, in some embodiments, the selected depth is about 50 µm to about 100 µm, about 200 µm to about 350 µm, or about 350 µm to about 600 µm. The leaching may be performed in a suitable acid, such as aqua regia, nitric acid, hydrofluoric acid, or mixtures of the foregoing.

The substrate 122 may be formed from any number of different materials, and may be integrally formed with, or otherwise bonded or connected to, the superhard table 120. Materials suitable for the substrate 122 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 122 comprises cobalt-cemented tungsten carbide. However, in certain embodiments, the superhard tables 120 may be omitted, and the superhard bearing elements 118 of the tilting pads 102 may be made from a superhard material, such as cobalt-cemented tungsten carbide. In other embodiments, the substrate 122 may be omitted and the superhard bearing elements 118 of the tilting pads 102 may be a superhard material, such as a polycrystalline diamond body that has been leached to deplete the metal-solvent catalyst therefrom or may be an un-leached PCD body.

In another embodiment, the superhard material of the superhard bearing elements 118 of the tilting pads 102 may be a superhard coating that forms the superhard bearing surface 114 of the tilting pads 102. The coating may be formed using a chemical vapor deposition technique, a physical vapor deposition technique, or any other deposition technique. For example, diamond may be deposited on a less hard surface to form the superhard bearing surface 114 using a chemical or physical vapor deposition technique.

In the illustrated embodiment, each of the plurality of superhard bearing elements 118 may be secured to a support plate 124 (FIG. 1B). The support plate 124 may, for example, be formed of a metal, an alloy, a cemented carbide material, other material, or any combination thereof. The substrate 122 of the superhard bearing element 118 may be secured to the support plate 124 by brazing, welding, mechanical fastening, press-fitting, or another suitable method. In some embodiments, the support plate 124 may define a pocket into which the superhard bearing element 118 of the tilting pads 102 may be tiltably or fixedly assembled and/or positioned. In an embodiment, the support plate 124 has an integral construction such that a single body may form substantially the entire support plate 124. In other embodiments, multiple segments of one or more materials may be used to form or define the support plate 124.

The degree to which the tilting pads 102 rotate or tilt may be varied in any suitable manner. For example, in an embodiment, the tilting pads 102 may be tilted about respective radial axes that extend generally radially outward from the thrust axis 106. Optionally, the support plate 124 may be attached to a pin 126. The pin 126 may, for example, be formed of a metal, an alloy, a cemented carbide material, other material, or any combinations thereof. The pin 126 may be allowed to at least partially rotate, or may otherwise define or correspond to a tilt axis 128. For example, according to some embodiments, the pin 126 is journaled or otherwise secured within the support ring 108 in a manner that allows the support plate 124 to rotate relative to the support ring 108. The pin 126 may allow the support plate 124 to rotate relative to the support ring 108, and optionally the pin 126 may also rotate or tilt relative to the tilt axis 128 of the pin 126. The support plate 124 and/or the pin 126 may rotate or tilt from about zero to about twenty degrees in some embodiments, such that the superhard bearing element 118 of the respective tilting pads 102 may also tilt from about zero to about twenty degrees relative to the tilt axis 128 or another reference axis. In other embodiments, the pin 126 and/or the superhard bearing element 118 of at least one tilting pads 102 may rotate from about zero to about fifteen degrees, such as a positive or negative angle (A) of about 0.5 to about 3 degrees (e.g., about 0.5 to about 1 degree or less than 1 degree) relative to the tilt axis 128 of the pin 126. In some cases, the support ring 108 may be configured for bidirectional rotation. In such a case, the pin 126 may be allowed to rotate in clockwise and/or counter-clockwise directions or may be limited in one or both directions. For example, the superhard bearing element 118 may thus tilt in either direction relative to the axis of the pin 126 and/or the support ring 108. For example, the superhard bearing element 118 may be rotated to a position anywhere from a positive or negative angle of about twenty degrees relative to an axis of the pin 126, such as a positive or negative angle (A) of about 0.5 to about 3 degrees (e.g., about 0.5 to about 1 degree or less than 1 degree) relative to the tilt axis 128 of the pin 126.

The pin 126 may be used to allow one or more tilting pads 102 to selectively rotate. For example, the tilting pads 102 may be self-establishing or limiting such that the tilting pads 102 may automatically or otherwise adjust to a desired tilt or other orientation based on the lubricant used, the axial forces applied along the thrust axis, the rotational speed of the runner and/or the thrust-bearing assembly 100, other factors, or combinations of the foregoing. In still other embodiments, the tilting pads 102 may be fixed at a particular tilt, or may be manually set to a particular tilt with or without being self-establishing.

Further, the pin 126 represents a single mechanism for facilitating rotation, translation, or other positioning of the tilting pads 102. In other embodiments, other mechanisms may be used. By way of illustration, leveling links, pivotal rockers, spherical pivots, biasing elements, other elements, or any combination of the foregoing may also be used to facilitate positioning of the tilting pads 102 in a tilted configuration. In an embodiment, the support plate 124 may be used to facilitate rotation or tilt of a respective tilting pad 102. The support plate 124 may, for example, be machined or otherwise formed to include a receptacle, an opening, or other structure into which the pin 126 may be at least partially received or secured. In embodiments in which the pin 126 is excluded, the support plate 124 may be machined or otherwise formed to include other components, such as spherical pivot, pivotal rocker, or leveling link interface. The support plate 124 may be formed of any suitable material, such as steel or other alloy; however, in some embodiments the support plate 124 is formed of a material that is relatively softer than the substrate 122, such that the support plate 124 may be relatively easily machined or formed into a desired shape or form. In other embodiments, the support plate 124 can be eliminated and the substrate 122 may be directly machined or formed to facilitate tilting of the tilting pad 102. Examples of tilting mechanisms that may be employed to practice any of the embodiments disclosed herein are disclosed in U.S. Published Patent Application No. 2014/0102810, the disclosure of which is incorporated herein, in its entirety, by this reference.

In some embodiments, each tilt axis 128 of a corresponding tilting pad 102 may be aligned with a radial reference line dividing (e.g., symmetrically) the superhard bearing surface 114. For example, when the support ring 108 may be configured for bi-directional rotation, the tilt axis 128 of the tilting pads 102 may be generally centered circumferentially between opposing edges of the tilting pads 102 (e.g., the leading edge and the trailing edge). In other embodiments, each tilt axis 128 or some of the tilt axes 128 of corresponding tilting pad(s) 102 may be offset relative to a center of the bearing surface 114 of the tilting pad 102. For example, when the support ring 108 is part of a rotor configured for preferred unidirectional rotation, the axis of rotation of the tilting pad 102 may be offset such that the axis of rotation is closer to one of the leading edge or the trailing edge of the tilting pad 102. In other embodiments, a tilt axis may be offset from a circumferential center of its bearing surface despite a rotor being configured for bidirectional rotation, or a tilt axis may be circumferentially centered despite a rotor being configured for unidirectional rotation.

Figure 1C:
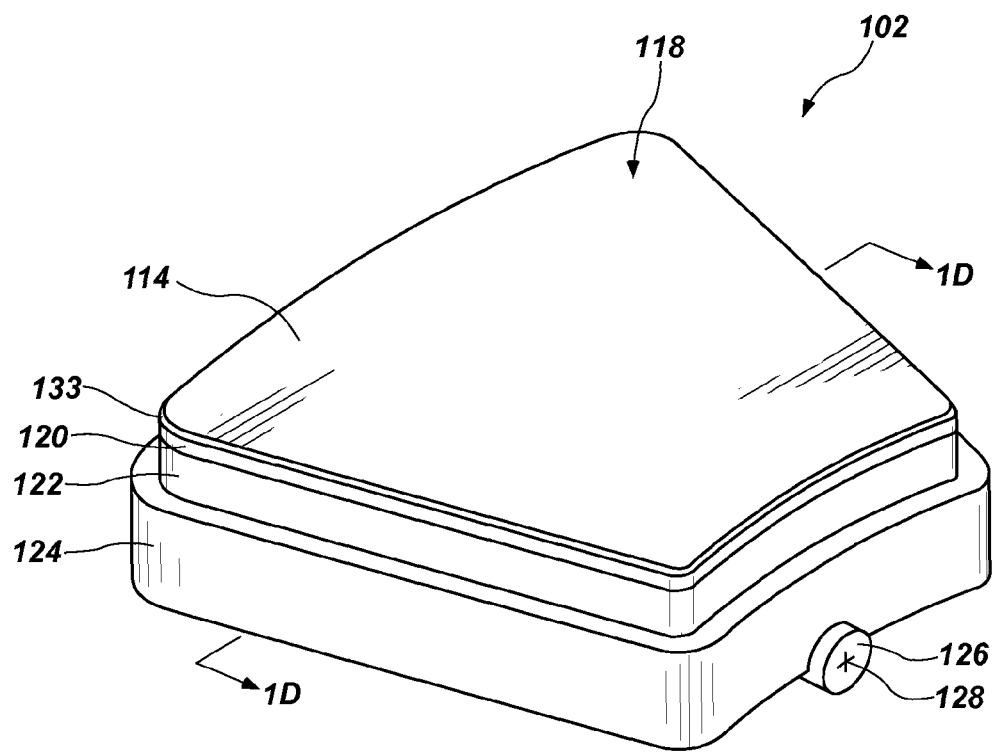
FIG. 1C is an isometric view of one of the tilting pads shown in FIGS. 1A and 1B, according to an embodiment.
Figure 1D:
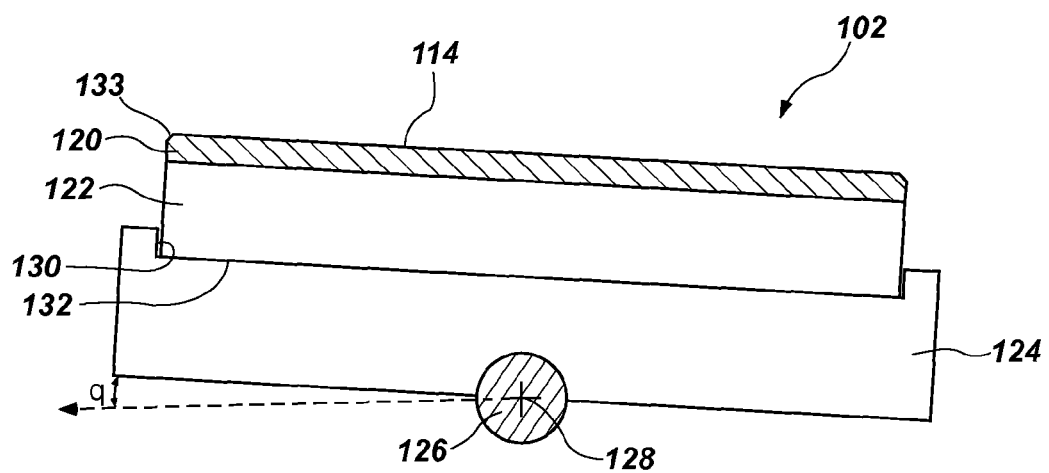
FIG. 1D is a cross-sectional view taken along line 1D-1D of the bearing tilting pad shown in FIG. 1C.

FIGS. 1C and 1D are isometric and cross-sectional views, respectively, of one embodiment for the tilting pads 102 shown in FIGS. 1A and 1B that may be used in connection with the thrust-bearing assembly 100 described above. The tilting pad 102 includes a superhard bearing element 118. As previously discussed, each tilting pad 102 may include the superhard table 120 bonded to the substrate 122, and the substrate 122 may further be secured within the support plate 124 by brazing, using high temperature adhesives, press-fitting, fastening with fasteners, or other suitable attachment mechanism. In the illustrated embodiment, the support plate 124 may facilitate attachment of the substrate 122 to the support plate 124 by including an interior surface 130 that defines an interior pocket 132. The interior pocket 132 may be sized to generally correspond to a size of the substrate 122. It is noted that the support plate 124 merely represents one embodiment for a support plate and other configurations may be used. For example, according to another embodiment, a support plate may lack a pocket or other receptacle. In still another embodiment, the support plate may be eliminated.

In the illustrated embodiment, the superhard bearing surface 114 of the superhard bearing element 118 (e.g., the superhard table 120) is substantially planar, although such an embodiment is merely illustrative. In other embodiments, the superhard bearing surface 114 of the superhard bearing element 118 may be curved, or have another contour or topography. Moreover, outer edges of the superhard bearing element 118 may optionally include a chamfer 133. The chamfer 133 may be formed by placing a chamfer on the individual outer edge regions of the superhard bearing element 118 or, if present, the superhard table 120. The superhard bearing element 118 may also take a number of other forms. For example, in FIG. 1C, the superhard bearing surface 114 is substantially pie-shaped with a chamfered edge. In other embodiments, the edges of a superhard bearing element 118 may define other shapes, including radiused, arcuate, generally circular, generally elliptical, generally trapezoidal, or other shaped surfaces, or may form a sharp edge.

Referring back to FIGS. 1A and 1B, as previously discussed, the thrust-bearing assembly 100 includes the plurality of sliding superhard bearing elements 104. Each of the sliding superhard bearing elements 104 may be partially disposed in a corresponding one of the recesses 113 (FIG. 1B) of the support ring 108 and secured partially therein via brazing, press-fitting, threadedly attaching, fastening with a fastener, using a high temperature adhesive, combinations of the foregoing, or another suitable technique. The sliding superhard bearing elements 104 may be distributed circumferentially about the thrust axis 106 in a single row. In other embodiments, the sliding superhard bearing elements 104 may be circumferentially distributed in two rows, three rows, four rows, or any other number of rows. In the illustrated embodiment, gaps 134 may be located between adjacent ones of the sliding superhard bearing elements 104. In an embodiment, at least one of, some of, or all of the gaps 134 may exhibit a width of about 0.00020 inches to 0.50 inches, such as about 0.00040 inches to 0.0010 inches, about 0.00040 inches to 0.080 inches, or 0.1 inches to 0.2 inches, 0.3 inches to 0.4 inches, or about 0.40 inches to 0.50 inches. In other embodiments, the gaps 134 may substantially be zero.

In the illustrated embodiment, one or more of the sliding superhard bearing elements 104 may be generally cylindrically shaped. However, in other embodiments, one or more of the sliding superhard bearing elements 104 may include a generally rounded rectangular body, a generally oval-shaped body, a generally wedge-shaped body, or any other suitable shaped body. Optionally, one or more of the sliding superhard bearing elements 104 may exhibit a peripherally-extending edge chamfer or radius. However, in other embodiments, the edge chamfer may be omitted.

The sliding superhard bearing elements 104 may include a superhard bearing surface 136. For example, the superhard bearing surface 136 of the sliding superhard bearing elements 104 may be made from any superhard material disclosed herein with respect to the superhard bearing elements 118. For example, the sliding superhard bearing element 104 may include a superhard table 138 bonded to a substrate 140. For example, the superhard table 138 may include a PCD table and the substrate 140 may include a cobalt-cemented tungsten carbide substrate bonded to the PCD table. The PCD table may be at least partially leached or unleached as disclosed herein with respect to the superhard bearing elements 118.

Figure 5A:
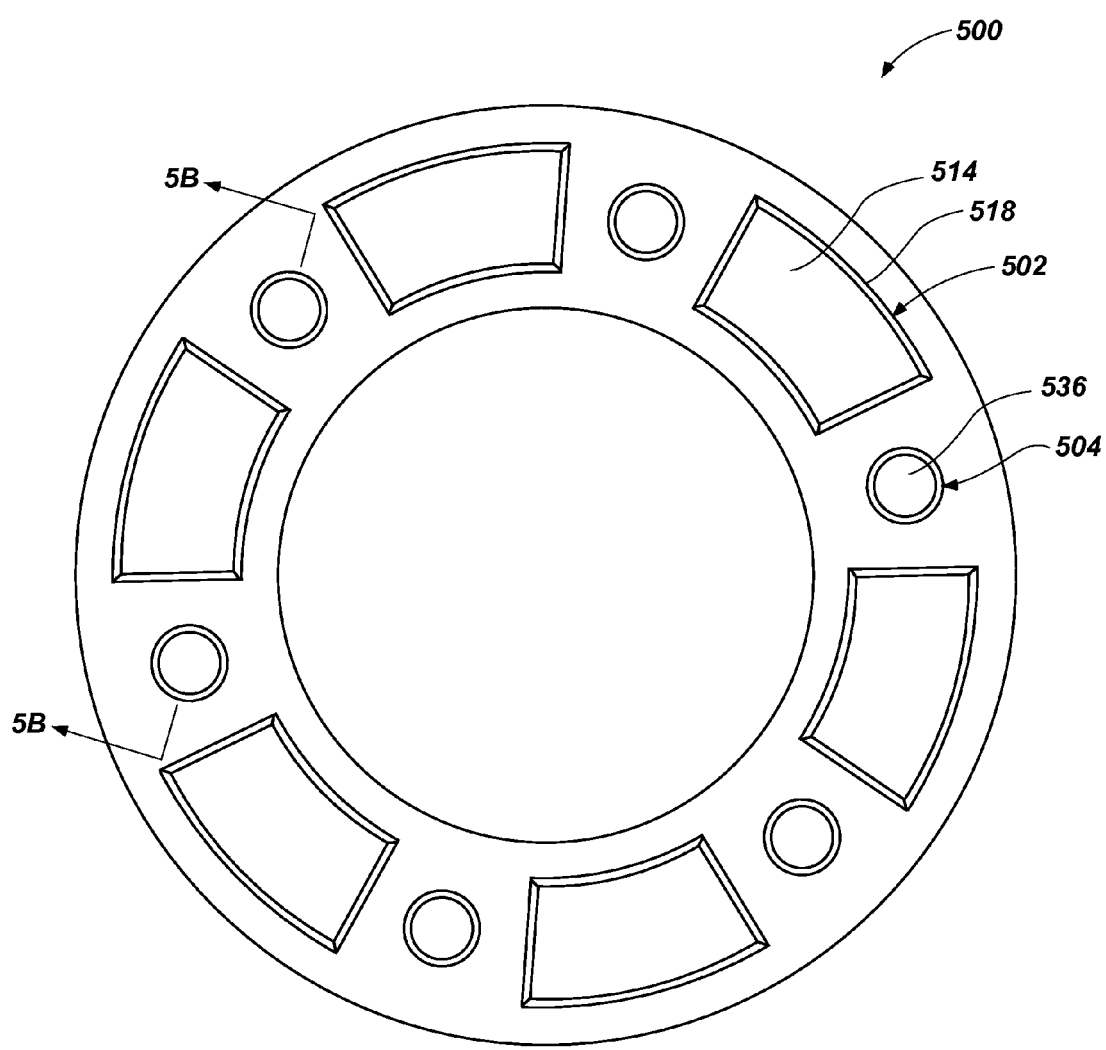
FIG. 5A is a top view of a thrust-bearing assembly including at least one row having a plurality of tilting pads and a plurality of sliding superhard bearing elements according to an embodiment.

In the embodiment illustrated in FIGS. 1A and 1B, the tilting pads 102 and the sliding superhard bearing elements 104 may be used in connection with a runner and/or other bearing assembly (e.g., the thrust-bearing assembly provided in FIG. 5A). In general, the thrust-bearing assembly 100 may rotate relative to a runner or other bearing assembly, while a lubricant or other fluid (e.g., seawater, drilling fluid) floods the tilting pads 102 and the sliding superhard bearing elements 104 of the thrust-bearing assembly and the runner/other bearing assembly. FIG. 1B illustrates that the superhard bearing surface 114 of the tilting pads 102 and the superhard bearing surface 136 of the sliding superhard bearing elements 104 are substantially coplanar when the tilting pads 102 are not tilted. In such an embodiment, both the tilting pads 102 and the sliding superhard bearing elements 104 support a portion of a load applied to the thrust-bearing assembly 100 at relatively low rotational speeds, thereby increasing the life of the tilting pads 102. However, at relatively high rotational speeds, the tilting pads 102 may tilt or operate at least partially hydrodynamically and cause the sliding superhard bearing elements 104 to limit supporting or even stop supporting at least a portion of the thrust load. As such, the tilting pads 102 may support at least a majority of a load carried by the thrust-bearing assembly 100 due to favorable use of the hydrodynamic forces within the lubricant. For example, at relatively high rotational speeds, the tilting pads 102 may cause a higher lubricant film thickness existing at a leading edge (e.g., an edge of the tilting pad 102 that would be traversed first by a reference line on a runner while the runner moves in a direction of rotation), than at a trailing edge (e.g., an edge of the tilting pad 102 over which such reference line is second to pass in the direction of rotation), at which or near which a minimum film thickness may develop. A high rotational speed may be, for example, a rotational speed sufficiently high to enable the tilting pads to support substantially the entire load.

Figure 2A:
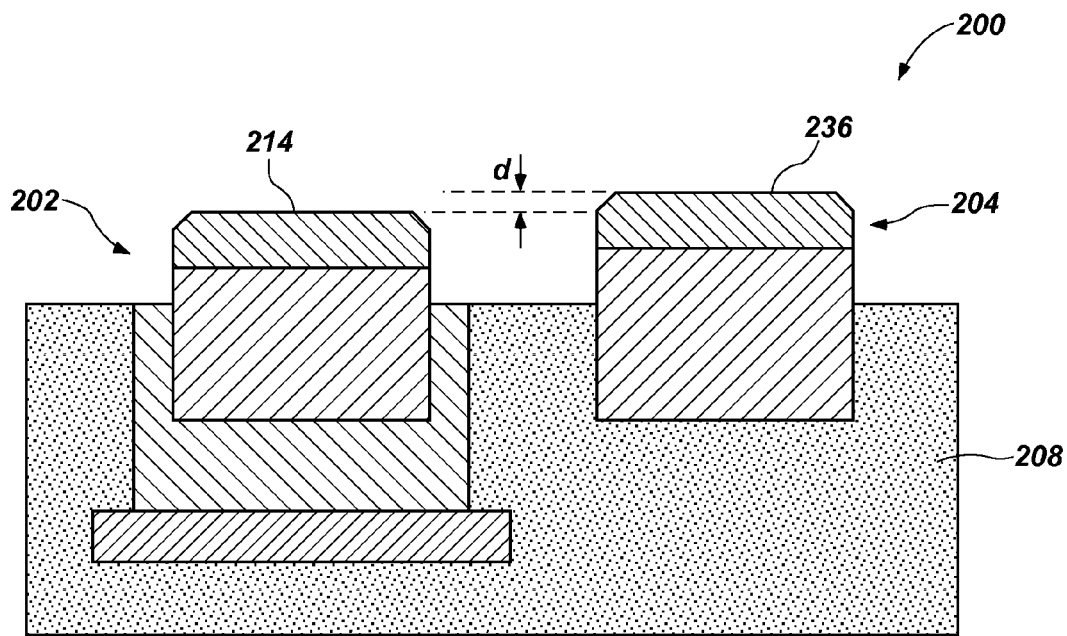
FIG. 2A is a partial cross-sectional view of a thrust-bearing assembly including a plurality of tilting pads and a plurality of sliding superhard bearing elements according to an embodiment.

FIG. 2A is a partial cross-sectional view of a portion of a passive thrust-bearing assembly 200 according to an embodiment. The thrust-bearing assembly 200 is similar to the thrust-bearing assembly 100 provided in FIG. 1A in that the thrust-bearing assembly 200 includes a support ring 208, tilting pads 202 tiltably secured to the support ring 208, and sliding superhard bearing elements 204 secured to the support ring 208. In the illustrated embodiment, when the tilting pads 202 are not tilted, each of the sliding superhard bearing elements 204 includes a superhard bearing surface 236 spaced further from the support ring 208 than superhard bearing surfaces 214 of the tilting pads 202 an offset distance "d." As such, the sliding superhard bearing elements 204 support substantially the entire load at relatively low rotational speeds, thereby prolonging the life of the tilting pads 202. As the rotation speed increases, a fluid film begins to form between the tilting pads 202 and a runner (not shown). At relatively high rotational speeds, the tilting pads 202 tilt such that the offset distance "d" is less than a thickness of the hydrodynamic fluid film so that the sliding superhard bearing elements 204 stop supporting the load and the tilting pads 202 support at least a majority of the load (e.g., substantially the entire load). It should be noted that the fluid film may develop on the sliding superhard bearing elements 204 in addition to the tilting pads 202.

Figure 2B:
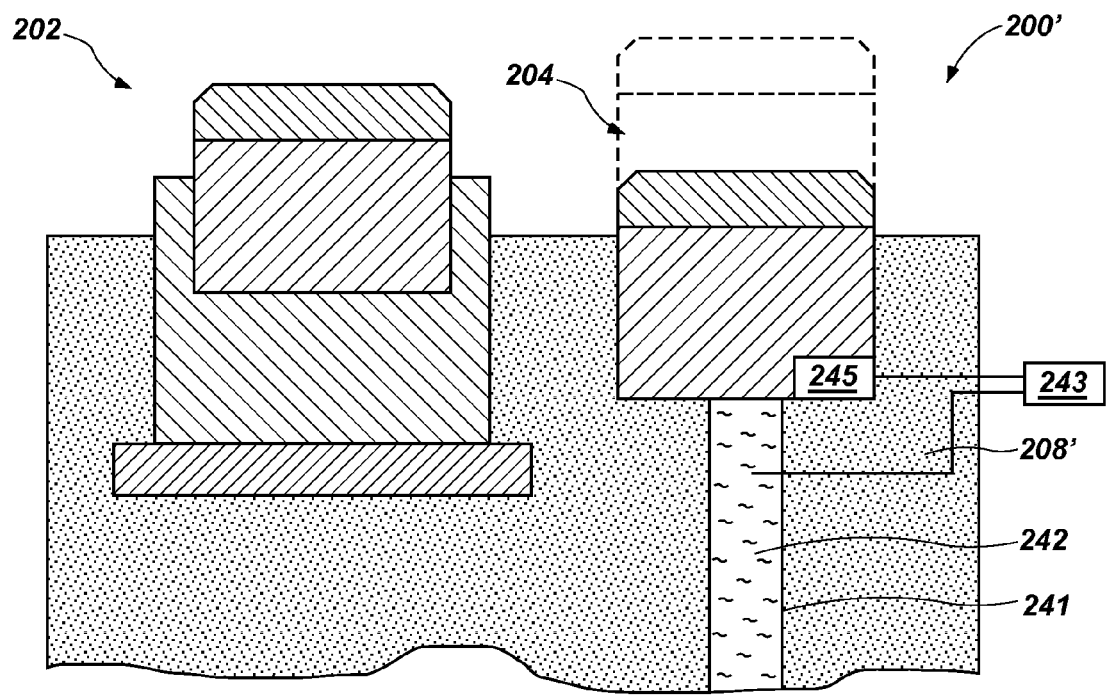
FIG. 2B is a partial cross-sectional view of a thrust-bearing assembly including a plurality of tilting pads and a plurality of sliding superhard bearing elements, at least one of which may be selectively raised or lowered using one or more actuators according to an embodiment.

FIG. 2B is a partial cross-sectional view of a portion of an active thrust-bearing assembly 200' according to an embodiment. The thrust-bearing assembly 200' is similar to the thrust-bearing assembly 100 provided in FIG. 1A in that the thrust-bearing assembly 200' includes a support ring 208', tilting pads 202 tiltably secured to the support ring 208', and sliding superhard bearing elements 204 secured to the support ring 208'. However, the thrust-bearing assembly 200' has an active configuration that regulates contact between superhard bearing elements by selectively positioning (e.g., raising or lowering) one or more sliding superhard bearing elements 204. For example, the sliding superhard bearing elements 204 may be raised or lowered by an actuator 242 (e.g., individually or collectively) that is operably coupled to a control system 243. For example, the actuator 242 may be an electro-mechanical actuator, a magnetically-driven actuator, a hydraulic actuator, a pneumatic actuator, or other suitable system. In the illustrated embodiment, the support ring 208 includes a perforation or channel 241 through or to which the actuator 242 may be operably coupled to a corresponding sliding superhard bearing element 204 and the actuator 242 may be a piston or similar device.

The active thrust-bearing assembly 200' may include at least one force sensor 245 that is configured to detect a force applied to at least one, some, or all of the plurality of sliding superhard bearing elements 204. The force sensor 245 may be operably coupled to the control system 243. The force sensor 245 may be integrated with the sliding superhard bearing element 204 or located elsewhere on the support ring 208'. A relatively large force applied to one of the plurality of sliding superhard bearing elements may indicate low or near relatively low rotational speeds. The force sensor 245 may include, for example, strain gauges, piezoresistive strain gauges, capacitive force sensors, electromagnetic force sensors, piezoelectric sensors, optical sensors (e.g., sensors utilizing Fiber Bragg Gratings), potentiometric force sensors, or other suitable sensors. Optionally or alternatively, the bearing assembly 200' may include a rotation sensor operably coupled to the active bearing assembly 200' configured to detect a rotational speed of the bearing assembly or a runner/rotor used in combination with the bearing assembly. As shown in FIG. 2B with the sliding superhard bearing element 204, when relatively low rotational speeds are detected, the one or more sliding superhard bearing elements 204 may be raised such that the sliding superhard bearing elements 204 support at least a portion of the load (e.g., substantially all of the load). As shown in FIG. 2B, when relatively high rotational speeds are detected, the one or more sliding superhard bearing elements 204 may be lowered such that the tilting pads 202 support substantially the entire load.

Figure 3A:
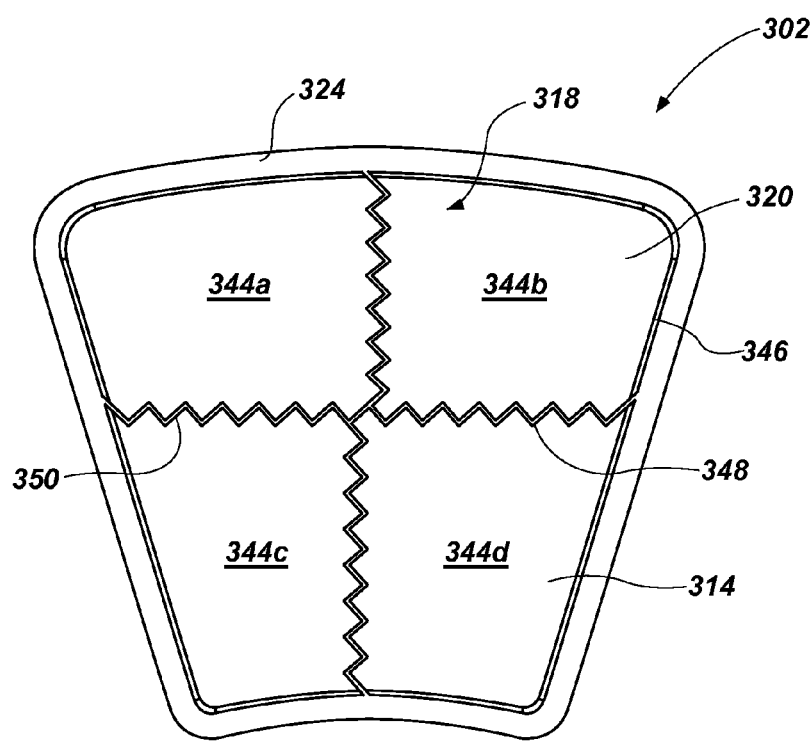
FIG. 3A is a top plan view of a tilting pad including multiple superhard bearing segments having serrated ends that form seams therebetween according to an embodiment.

FIG. 3A illustrates a top plan view of an embodiment of a tilting pad 302 that may be employed as a tilting pad in any of the bearing assemblies disclosed herein. The tilting pad 302 may include a plurality of superhard bearing segments 344a-d, each of which includes a superhard bearing element 318 that may include a superhard table 320 bonded to a substrate (not shown). For example, the superhard bearing elements 318 may be made from any of the superhard or non-superhard materials and structures used for the tilting pads 102. The superhard table 320 and/or substrate are optionally bonded or otherwise connected to a support plate 324. Each superhard table 320 includes a superhard bearing surface 314 that collectively forms a larger, continuous superhard bearing surface.

The superhard bearing segments 344a-d each may include an outer edge region 346 and an interior edge region 348. The superhard bearing segments 344a-d may be configured with a serrated geometry at the interior edge regions 348. Such a configuration may allow adjacent superhard bearing segments 344a-d to mate and at least partially interlock with each other, while also defining seams 350 therebetween. The seams 350 may exhibit a geometry that limits fluid leakage through the gaps between adjoining superhard bearing segments 344a-d.

The seams 350 between adjacent superhard bearing segments 344 are merely illustrative, and the seams 350 between superhard bearing segments 344 and/or configurations of interior edge regions 348 of superhard bearing segments 344 may have any number of configurations. For example, a set of interconnecting superhard bearing segments may have substantially straight, serrated, sawtoothed, sinusoidal-like, curved, or otherwise shaped interior edge regions, or any combination of the foregoing. Moreover, some portions of interior edge regions may have one configuration, while another portion of interior edge regions on the same superhard bearing segment may have a different configuration or shape. Accordingly, different superhard bearing segments may also include different mating geometries or other configurations. In an embodiment, the plurality of superhard bearing segments 344a-d may have a coating thereon that at least partially fills the seams 350. The coating may be applied using chemical vapor deposition, physical vapor deposition, other deposition techniques or combinations thereof. Optionally or additionally, sealant materials may at least partially fill the seams 350.

An assembly of superhard bearing segments may be utilized when certain conditions are met, or in any number of other circumstances or industries. For example, an application may be identified where it may be beneficial to use a bearing element including a superhard material. However, the superhard material may have associated production limits (e.g., size, availability, etc.). When the superhard bearing element has a size, shape, or other feature(s) exceeding such production limits, the superhard bearing element may be fashioned out of multiple individual superhard segments that collectively define a superhard bearing surface of the superhard bearing element. In other cases, however, the type of material comprising the superhard bearing element may not have the same production limits as PDCs or other superhard materials, or the superhard bearing element may be sized small enough to allow a single superhard or other material to form the superhard bearing surface 314.

Figure 3B:
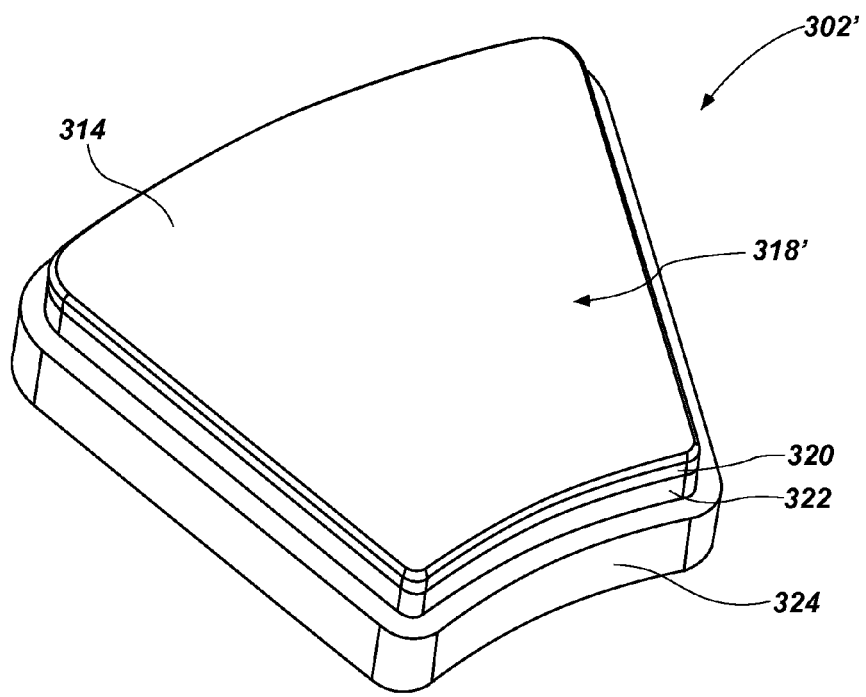
FIG. 3B is an isometric view of a tilting pad having a continuous bearing element according to another embodiment.

FIG. 3B illustrates an isometric view of an embodiment of a tilting pad 302' having a continuous superhard bearing surface 314' that may be employed in a bearing assembly. The tilting pad 302' may have a size and/or comprise a material configured such that a single segment may form a continuous surface of the superhard bearing element 318'. For example, the tilting pad 302' may include a superhard table 320' bonded to a substrate 322. The substrate 322 may, in turn, be bonded to a support plate 324. Optionally, the support plate 324 is oversized relative to the substrate 322; however, the support plate 324 may also be about the same size or smaller than the substrate 322. In this embodiment, a single element may define substantially the entire superhard bearing element 318'. For example, the single element may exhibit a length and/or width that may measure approximately 15 mm by 10 mm, such that a single superhard table 320 made from polycrystalline diamond or other materials may be fashioned into the desired shape, even in the absence of providing multiple interlocking, adjoining, or adjacent superhard segments. In other embodiments, the superhard bearing element 318' may have other sizes and may even exceed a maximum size available for PDCs. For example, other superhard materials (e.g., tungsten carbide, reaction-bonded ceramics, and reaction-bonded ceramics containing diamond particles) or any other superhard material disclosed herein may be used to form the superhard bearing element 318' using a single, integral segment.

Figure 4:
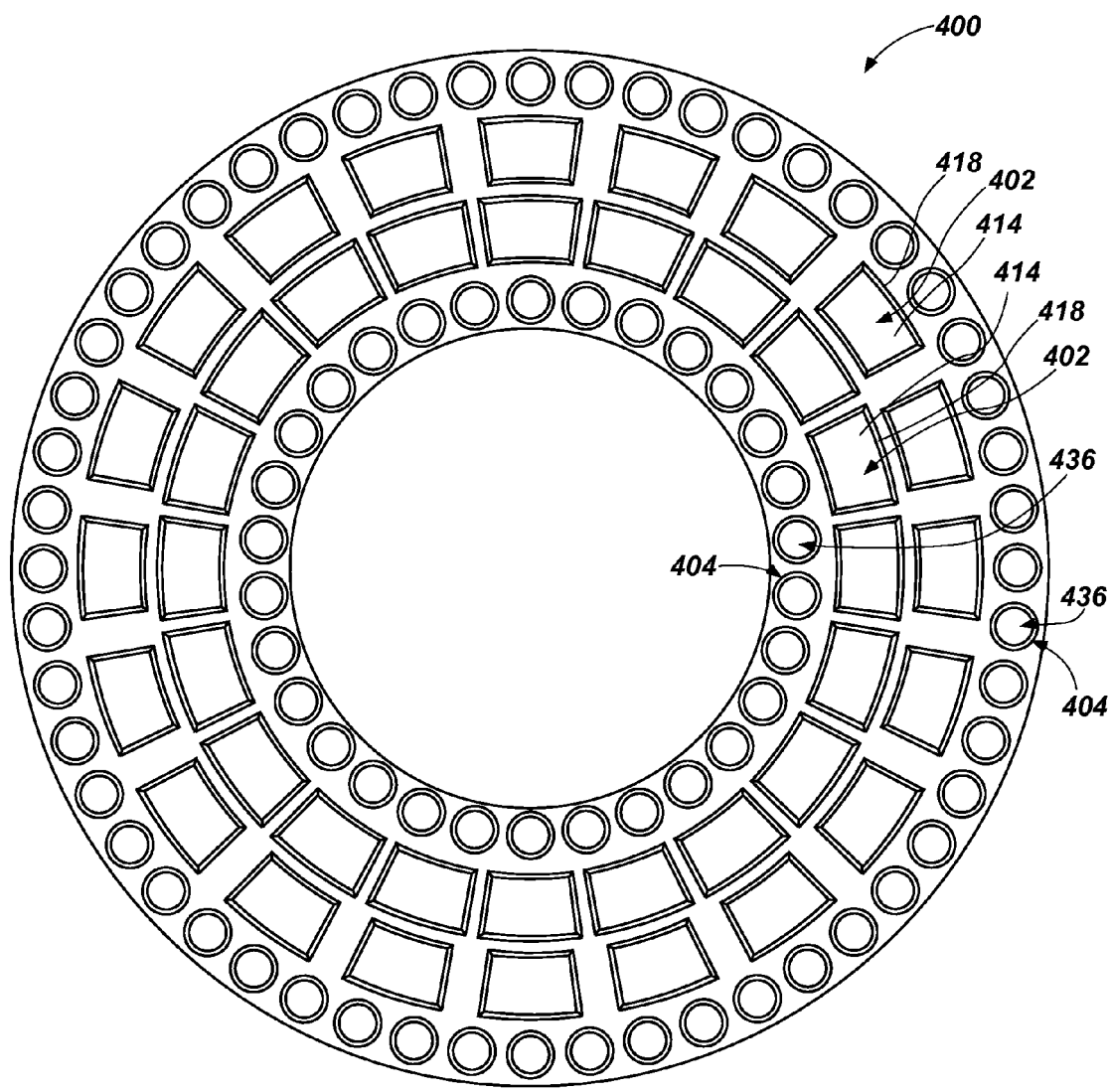
FIG. 4 is a top view of a thrust-bearing assembly including two rows of tilting pads and two rows of sliding superhard bearing elements according to an embodiment.

FIG. 4 illustrates a top plan view of an embodiment of a thrust-bearing assembly 400 including at least two rows of a plurality of tilting pads 402 and at least two rows of a plurality of sliding superhard bearing elements 404. Each of the tilting pads 402 may include at least one bearing element 418 having a superhard bearing surface 414. Each of the sliding superhard bearing elements 404 includes a superhard bearing surface 436. Each of the bearing elements 418 of the tilting pads 402 and the sliding superhard bearing elements 404 may be formed of any of the superhard materials disclosed herein. For example, each of the bearing elements 418 of the tilting pads 402 and each of the sliding superhard bearing elements 404 may include a superhard table (e.g., a PCD table) bonded to a substrate.

In the illustrated embodiment, the thrust-bearing assembly 400 includes two rows of the tilting pads 402 and two rows of the sliding superhard bearing elements 404. However, it is understood that the thrust-bearing assembly 400 may include more or less rows of each type of bearing element. For example, the thrust-bearing assembly 400 assembly may include one row of tilting pads 402 and two or more rows of the sliding superhard bearing elements 404. In another embodiment, the thrust-bearing assembly 400 may include two or more rows of the tilting pads 402 and one row of the sliding superhard bearing elements 404. In yet another embodiment, the thrust-bearing assembly 400 may include three or more rows of the tilting pads 402, the sliding superhard bearing elements 404, or both. The number of rows of each type of bearing element may be selected based on the expected load, the expected number of starts and stops, the expected size of the bearing assembly, or whether the bearing element includes a passive or active system.

It is noted that the thrust-bearing assembly 400 includes two rows of the tilting pads 402 partially surrounded by the two rows of the sliding superhard bearing elements 404. However, it is understood that the position and/or configuration of the bearing elements may include any position and/or configuration without limitation. For example, one or more rows of tilting pads 402 may be more proximate to the thrust axis than the one or more rows of the sliding superhard bearing elements 404. In another embodiment, the one or more rows of the tilting pads 402 may be more remote from the thrust axis than the one or more rows of the sliding superhard bearing elements 404. In another embodiment, the two or more rows of the tilting pads 402 are not partially surrounded by the two or more rows of the sliding superhard bearing elements 404. The position and/or configuration of the bearing elements may be selected based on the expected load distribution during relatively low rotational speeds and/or relatively high rotational speeds.

FIG. 5A is a top plan view of an embodiment of a thrust-bearing assembly 500 including at least one row having a plurality of tilting pads 502 and a plurality of sliding superhard bearing elements 504. Each of the tilting pads 502 may include at least one bearing element 518 having a superhard bearing surface 514. Each of the sliding superhard bearing elements 504 includes a superhard bearing surface 536. Each bearing element of the tilting pads 502 and the sliding superhard bearing elements 504 may be formed of any of the superhard materials and configurations disclosed herein.

In the illustrated embodiment, the thrust-bearing assembly 500 includes one row having a plurality of tilting pads 502 and a plurality of sliding superhard bearing elements 504. However, it is understood that the thrust-bearing assembly 500 may include two or more rows having a plurality of tilting pads 502 and a plurality of sliding superhard bearing elements 504. Similarly, the thrust-bearing assembly 500 is arranged such that each single sliding superhard bearing element 504 is positioned between two tilting pads 502 and each tilting pad 502 is positioned between two sliding superhard bearing elements 504. However, it is understood that the plurality of tilting pads 502 and the plurality of sliding superhard bearing elements 504 may be positioned in any arrangement without limitation. For example, the one row may include a group of one or more tilting pads 502 separated from another group of one or more tilting pads 502 by one or more sliding superhard bearing elements 504. The number of rows and the arrangement of the plurality of tilting pads 502 and the plurality of sliding superhard bearing elements 504 may be selected based on the expected load, the expected number of starts and stops, the expected size of the bearing assembly, the expected average rotational speed, whether the bearing element includes a passive or active system, or combinations thereof.

Figure 5B:
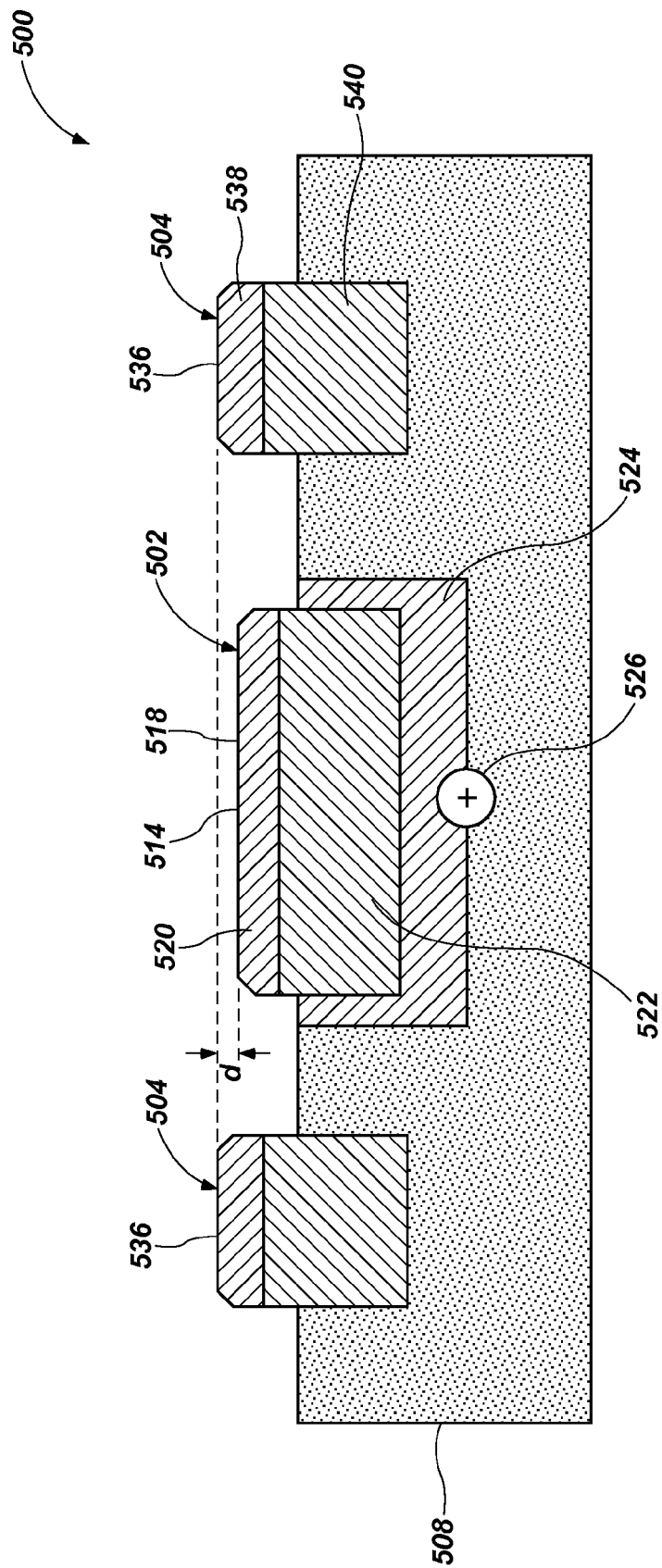
FIG. 5B is a partial cross-sectional view of the thrust-bearing assembly shown in FIG. 5A.

FIG. 5B is a partial cross-sectional view of a portion of the thrust-bearing assembly 500 shown in FIG. 5A according to an embodiment. The thrust-bearing assembly 500 includes tilting pads 502 having a superhard bearing table 520 bonded to a substrate 522 that is mounted to a support plate 524. The tilting pads 502 include a pin 526 that allows the support plate 524 to rotate relative to a support ring 508. The thrust-bearing assembly 500 further includes sliding superhard bearing elements 504 including a superhard table 538 bonded to a substrate 540. In the illustrated embodiment, when the tilting pads 502 are not tilted, each of the sliding superhard bearing elements 504 includes a superhard bearing surface 536 spaced further from the support ring 508 than the bearing surfaces 514 of the tilting pads 502 by an offset distance "d." As such, the sliding superhard bearing elements 504 support substantially the entire load at relatively low rotational speeds. As the rotation speed increases, a fluid film begins to form between the tilting pads 502 and a runner (not shown). At relatively high rotational speeds, the tilting pads 502 tilt such that the offset distance "d" is less than a thickness of the hydrodynamic fluid film so that the sliding superhard bearing elements 504 stop supporting the load and the tilting pads 502 support at least a majority of the load. It should be noted that, in some embodiments, the thrust-bearing assembly 500 may include one or more actuators (or other mechanism) and one or more sensors to enable selective positioning of the sliding superhard bearing elements 504 similar to the active thrust-bearing assembly 200'.

Figure 6A:
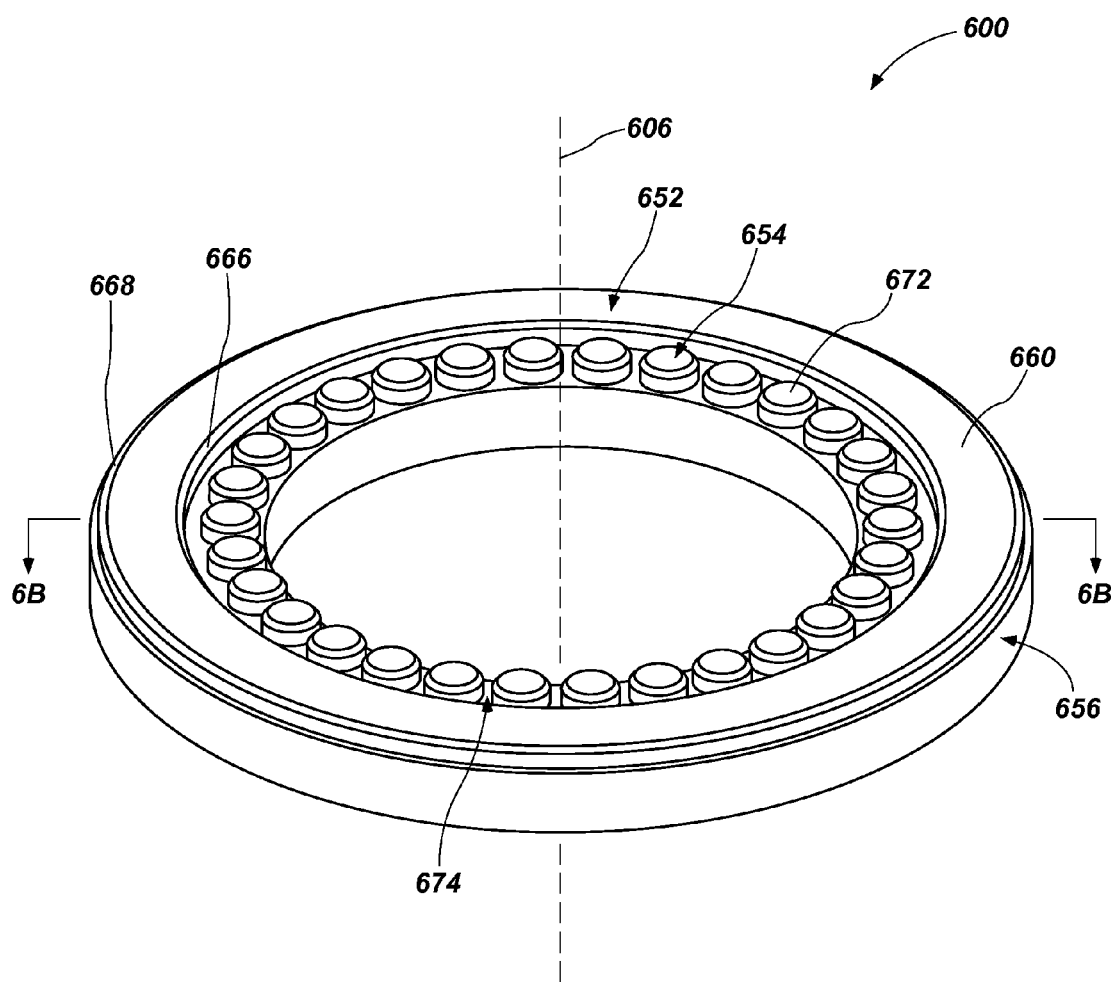
FIG. 6A is an isometric view of a thrust-bearing assembly including a continuous bearing element and a plurality of sliding superhard bearing elements according to an embodiment.
Figure 6B:
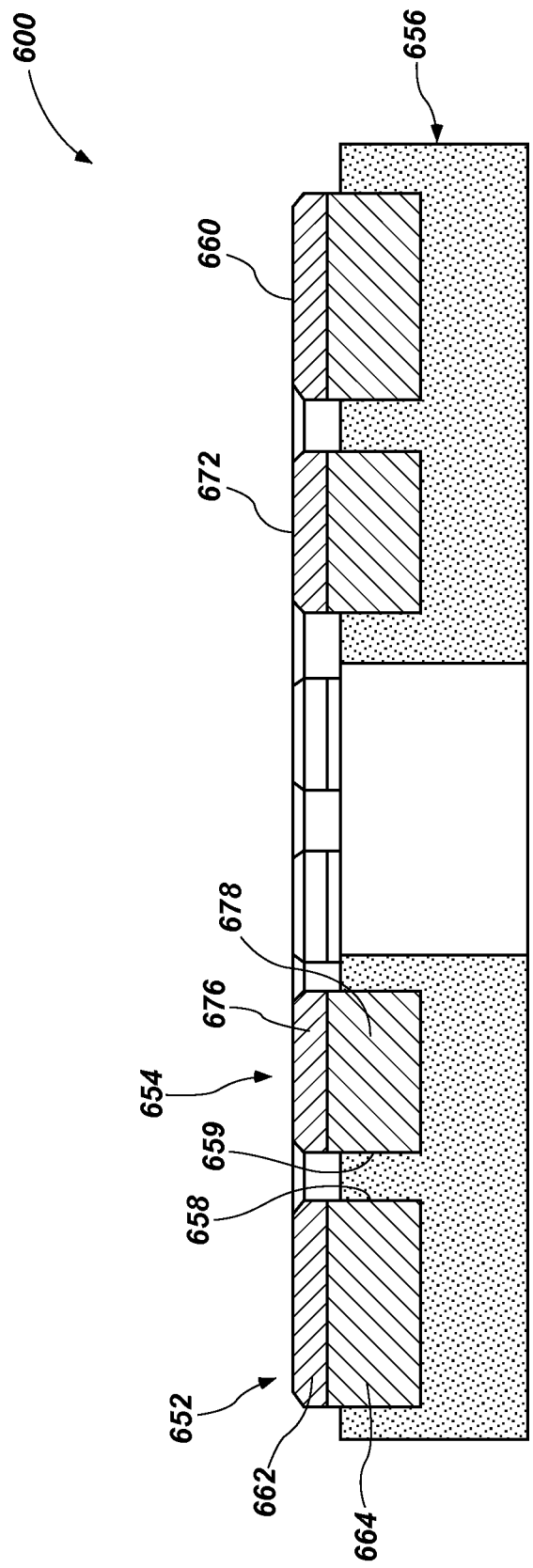
FIG. 6B is a side cross-sectional view taken along line 6B-6B of the thrust-bearing assembly shown in FIG. 6A.

FIGS. 6A and 6B are isometric and side cross-sectional views, respectively, of an embodiment of a thrust-bearing assembly 600 including a continuous bearing element 652 and an optional plurality of sliding superhard bearing elements 654. The thrust-bearing assembly 600 may form a stator or a rotor of a thrust-bearing apparatus. The thrust-bearing assembly 600 may include a support ring 656 defining an opening through which a shaft (not shown) may extend. The support ring 656 may be made from the same materials as the support ring 108 shown in FIG. 1A. The support ring 656 may include one or more rows of recesses, holes, slots, channels, grooves, or apertures formed therein to accommodate sliding superhard bearing elements 654 and/or continuous bearing elements 652 (e.g., that are radially spaced from each other). For example, the support ring 656 may include one or more annular slots 658 (FIG. 6B) that receive corresponding ones of the continuous bearing element 652. Optionally, the support ring 656 may include one or more rows of recesses 659 (FIG. 6B) that receive one or more rows of sliding superhard bearing elements 654. For example, the support ring 656 receives the continuous bearing element 652 and one row of sliding superhard bearing elements 654 that are radially spaced from the continuous bearing element 652.

The continuous bearing element 652 may exhibit a generally annular geometry that extends about a thrust axis 606. The continuous bearing element 652 includes a continuous bearing surface 660. The continuous bearing element 652 may include superhard materials or other materials such as polycrystalline diamond, reaction-bonded silicon carbide, steel, other metals or alloys, any other suitable material, or combinations thereof. In the illustrated embodiment, the continuous bearing surface 660 may have an integral construction such that a single element forms the substantially all of the continuous bearing element 652. The continuous bearing element 652 is attached to the support ring 656 in a fixed position. For example, the continuous bearing element 652 is at least partially received by the annular slot (FIG. 6B) and mounted to the support ring 656. The continuous bearing element 652 may be secured at least partially within the annular slot 658 of the support ring 656 by brazing, press-fitting, welding, using fasteners, clamping, using other mechanical attachments, using another suitable technique, or combinations thereof.

The continuous bearing element 652 may generally face and be configured to contact (e.g., either directly or indirectly through a fluid) a plurality of bearing elements of an opposing thrust-bearing assembly (e.g., the thrust-bearing assembly 100 shown in FIGS. 1A and 1B). In an embodiment, the continuous bearing element 652 may generally face a plurality of tilting pads of an opposing thrust-bearing assembly. In an embodiment, the thrust-bearing assembly 600 may include two or more continuous bearing elements 652. For example, if the opposing thrust-bearing assembly is similar to the thrust-bearing assembly 400 illustrated in FIG. 4, the thrust-bearing assembly 600 may include two continuous bearing elements 652 that may generally face and be configured to respectively face corresponding rows of tilting pads, respectively, or the thrust-bearing assembly 600 may include a single continuous bearing element 652 that is sized and configured to generally face both rows of tilting pads.

The continuous bearing element 652 may be formed from any of the superhard materials disclosed herein with respect to the superhard bearing elements 118. For example, the continuous bearing element 652 may be formed of a superhard table 662 (e.g., an at least partially leached PCD table) and a substrate 664. However, the continuous bearing element 652 may alternatively be formed from any of the non-superhard materials disclosed for the tilting pads 102, such as steel. Additionally, the continuous bearing element 652 may be formed to have a selected nominal radial width. The selected nominal radial width is the shortest distance between an inner edge 666 and an outer edge 668 of the continuous bearing element. The selected nominal width may be less than about 6 inches, such as less than about 4 inches, less than about 2 inch, less than 1 inch, about 0.25 inches to about 0.5 inches, about 0.5 inches to about 1 inch, about 1 inch to about 2 inches, or about 2 inches to about 4 inches.

In the illustrated embodiment, the continuous bearing element 652 may be formed from a single element. In such an embodiment, it may be necessary to form a hole therein. For example, the hole may be formed in the continuous bearing element 652 using a variety of techniques. The hole may be sized and configured to receive a rotating shaft. In an embodiment, the hole may be machined into a disk from which the continuous bearing element 652 is made by using electrical discharge machining (e.g., plunge electrical discharge machining and/or wire electrical discharge machining), drilling, milling, laser drilling, other suitable techniques, or combinations thereof. For example, plunge electrical discharge machining may be used to create a small starter though hole in the disk from which the continuous bearing element 652 is made. Wire electrical discharge machining may then be used to enlarge the small starter though hole to form the larger hole. In another embodiment, a laser is used to create the small starter through hole or the laser may be used to form the entire hole. In another embodiment, a sacrificial material (e.g., a material that is that is more easily removed than the superhard material) may be used to define the hole of the continuous bearing element 652. For example, a sacrificial material (e.g., tungsten, tungsten carbide, hexagonal boron nitride, or combinations thereof) is laterally surrounded by unsintered diamond particles and is then subjected to an HPHT process. The sacrificial material is then removed from the PCD table (e.g., mechanically, by blasting or via a leaching process) to form the hole. Optionally, one or more of the continuous bearing elements 652 may exhibit a peripherally-extending edge chamfer or radius. However, in other embodiments, the edge chamfer may be omitted. Examples of bearing assemblies including a continuous bearing element formed from a single element are disclosed in U.S. Provisional Patent Application No. 62/087,132, the disclosure of which is incorporated herein, in its entirety, by this reference.

As discussed above, the thrust-bearing assembly 600 optionally includes the plurality of sliding superhard bearing elements 654 having a sliding superhard bearing surface 672. Each of the plurality of sliding superhard bearing elements 654 may be configured substantially similar to the sliding superhard bearing elements 104. For example, each of the sliding superhard bearing elements 654 may be disposed in a corresponding recess 659 (FIG. 6B) of the support ring 656 and distributed circumferentially about the thrust axis 606 in one or more rows. The sliding superhard bearing elements 654 may have one or more gaps 674 located between adjacent sliding superhard bearing elements 654 exhibiting a width of about 0.00020 inches to 0.50 inches. In another embodiment, the one or more of the sliding superhard bearing elements 654 may have a generally cylindrical shaped body, any other suitable shaped body and/or a peripherally-extending edge chamfer or radius. Additionally, each of the sliding superhard bearing elements 654 may be made from any of the superhard materials disclosed herein with respect to the superhard bearing elements 118. For example, the sliding superhard bearing element 654 may include a superhard table 676 bonded to a substrate 678.

Referring to FIG. 6B, in the illustrated embodiment, the continuous bearing surface 660 may be substantially coplanar with the sliding superhard bearing surface 672. The illustrated thrust-bearing assembly 600 exhibits a passive configuration. In such an embodiment, the continuous bearing element 652 and the sliding superhard bearing elements 654 may support a portion of the load at relatively low rotational speeds. However, at relatively high rotational speeds, the continuous bearing element supports at least a majority of the load carried by the thrust-bearing assembly 600 at relatively high rotational speeds. In another embodiment, the sliding superhard bearing surface 672 of the sliding superhard bearing elements 654 may be spaced further from the support ring 656 than the continuous bearing surface 660 an offset distance. As such, the sliding superhard bearing elements 654 may support substantially the entire load at relatively low rotational speeds to thereby prolong the life of a bearing assembly (e.g., protecting tilting pads 202). In another embodiment, the thrust-bearing assembly 600 may exhibit an active configuration. For example, the thrust-bearing assembly 600 may include control system 243 (FIG. 2B). For example, one or more actuators may raise or lower one or more of the sliding superhard bearing elements 654 depending on operating conditions so that the sliding superhard bearing elements 654 support at least a portion of the load at relatively low rotational speeds but the continuous bearing element 652 supports at least a majority of the load at relatively high rotational speeds.

Figure 7:
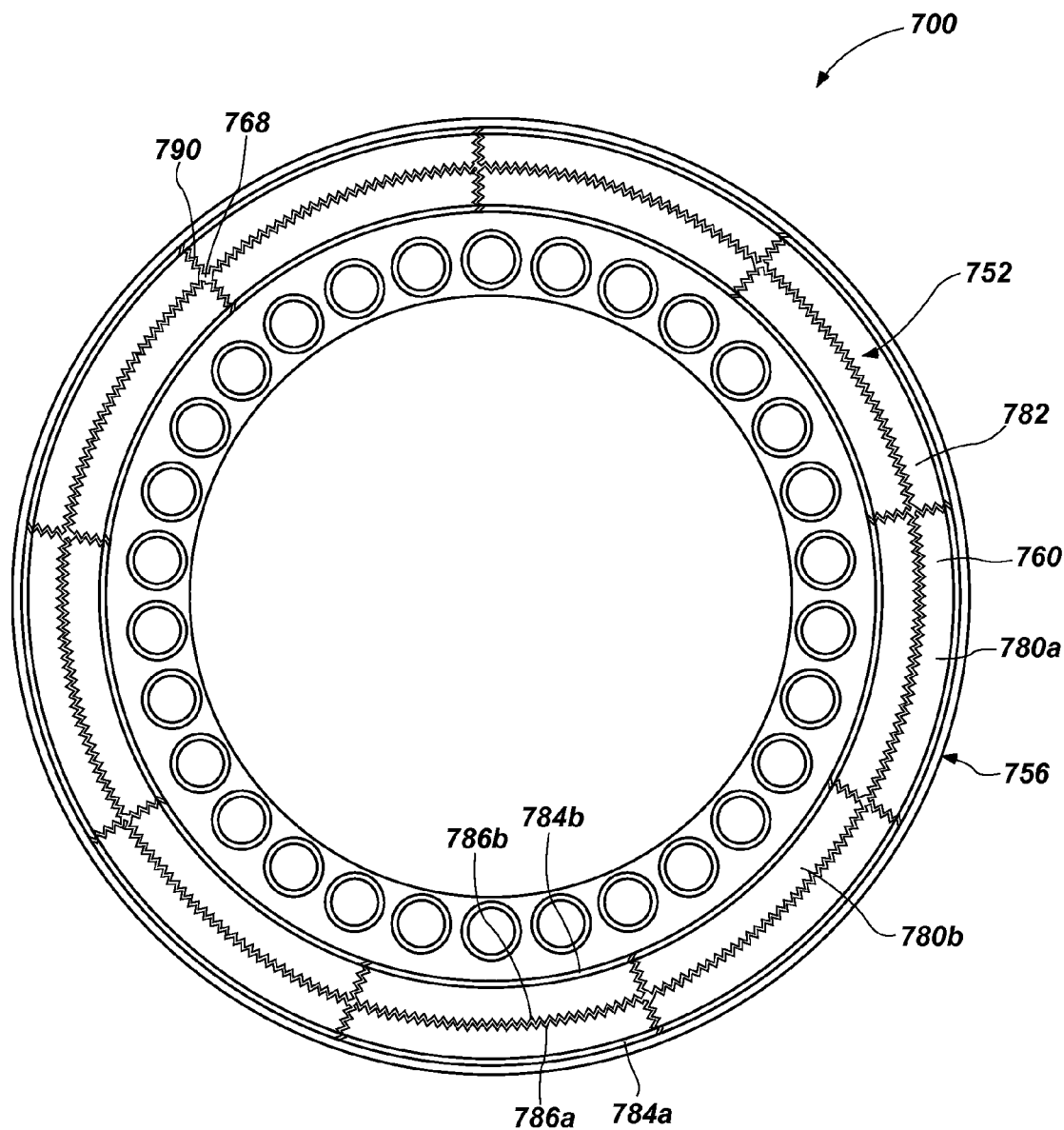
FIG. 7 is a top view of a thrust-bearing assembly including a substantially continuous bearing element and a plurality of sliding superhard bearing elements according to an embodiment.

FIG. 7 is a top view of an embodiment of a thrust-bearing assembly 700 that is substantially similar to the thrust-bearing assembly 600 of FIG. 6A except that the thrust-bearing assembly 700 includes a substantially continuous bearing element 752. In an embodiment, the substantially continuous bearing element 752 may be formed of multiple superhard bearing segments 780a and 780b. Each of the multiple superhard bearing segments 780a and 780b may be formed from any of the superhard materials disclosed herein with respect to the superhard bearing element 118. A substantially continuous bearing element 752 element may be used instead of a continuous bearing element due to size limitations of the material, budget limitations or other production limitations on the bearing elements. For example, the multiple superhard bearing segments 780a and 780b may include a superhard table 782 (e.g., a partially leached PCD table) bonded to a substrate (not shown). The surfaces of the multiple superhard bearing segments 780a and 780b may collectively form a substantially continuous bearing surface 760 of the thrust-bearing assembly 700. Any of the continuous bearing elements disclosed herein may include a substantially continuous bearing element (i.e., an at least substantially continuous bearing element).

An embodiment by which the multiple superhard bearing segments 780a and 780b may be assembled together is illustrated in FIG. 7. However, in other embodiments, multiple superhard bearing segments may be assembled together in other manners, or using differing geometries. The multiple superhard bearing segments 780a and 780b may extend circumferentially in a generally circular manner, and may be secured to the support ring 756 using a brazing, press-fit, fastener, high temperature adhesive or other attachment mechanism. The outer superhard bearing segments 780a may include, in some embodiments, an outer edge section 784a and at least one interior edge section 786a. The outer edge sections 784a of the collective set of outer superhard bearing segments 780a may define all or a portion of the outermost edge of the continuous bearing surface 760. Similarly, the inner superhard bearing segments 780b may include, in some embodiments, at least one outer edge section 784b and an interior edge section 786b. The outer edge sections 784b of the collective set of inner superhard bearing segments 780b may define all or a portion of the innermost edge of the continuous bearing surface 760.

The interior edge sections 786a and 786b of the multiple superhard bearing segments 780a and 780b, respectively, may interconnect with, or otherwise correspond to, other of the multiple superhard bearing segments 780a and 780b. For example, each outer superhard bearing segment 780a may interconnect at opposing ends to other outer superhard bearing segments 780a that extend circumferentially relative thereto. Each outer superhard bearing segment 780a may also interconnect with one or more inner superhard bearing segment 780b which extend radially inward relative to the outer superhard bearing segment 780a. Such an arrangement is, however, merely exemplary. In other embodiments, there may be more than two superhard bearing segments extending radially to form the substantially continuous bearing surface 760, any number of different segments extending circumferentially to form the substantially continuous bearing surface 760, or a superhard bearing segment may interconnect with a segment extending at least partially in both circumferential and radial directions with respect thereto. Accordingly, a substantially continuous bearing surface 760 may be formed by a collective set of multiple superhard bearing segments 780a and 780b.

In FIG. 7, each of the interior edge sections 786a and 786b may have an alternating slot-and-ridge pattern, although such a configuration is merely illustrative. In other embodiments, the interior edge sections 786a and 786b may exhibit a serrated, straight, curved, or other geometry. Such geometries may enable mating adjacent superhard bearing segments together and/or limiting fluid leakage through seams between adjacent superhard bearing segments.

Regardless of the particular arrangement, a set of seams 788 may form between adjoining superhard bearing segments 780a and 780b of the substantially continuous bearing element 752. The seams 788 may provide a tortuous or winding path that limits fluid leakage radially through the seams 788. The seams 788 may correspond to a relatively small gap 790 existing between the multiple superhard bearing segments 780a and 780b. The gaps 790 may have a width of about 0.001 mm to about 3.5 mm, more particularly a width of about 0.0025 mm to about 2.5 mm, and more particularly a width of about 0.125 mm to about 1.25 mm. More particularly still, the gaps 790 may have a width from about 0.005 mm up to about 1.0 mm. The gaps 790 are optionally filled with a sealant material to help further prevent fluid leakage through the seams 788. Examples of sealant materials may include a ceramic material, metallic material, polymeric material, or another suitable material, or any combination of the foregoing. In an embodiment, the sealant material may exhibit abrasion and/or erosion resistance to commonly used drilling fluids (as known as drilling mud). For example, the sealant material may comprise diamond or a carbide material formed by chemical vapor deposition.

Figure 8A:
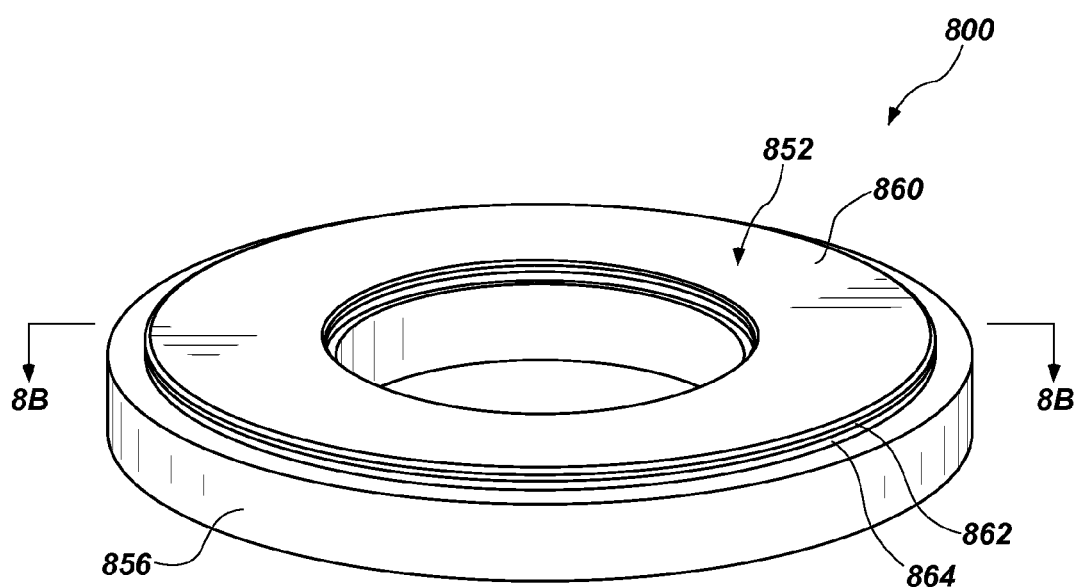
FIG. 8A is an isometric view of a thrust-bearing assembly including a continuous bearing element according to an embodiment.
Figure 8B:
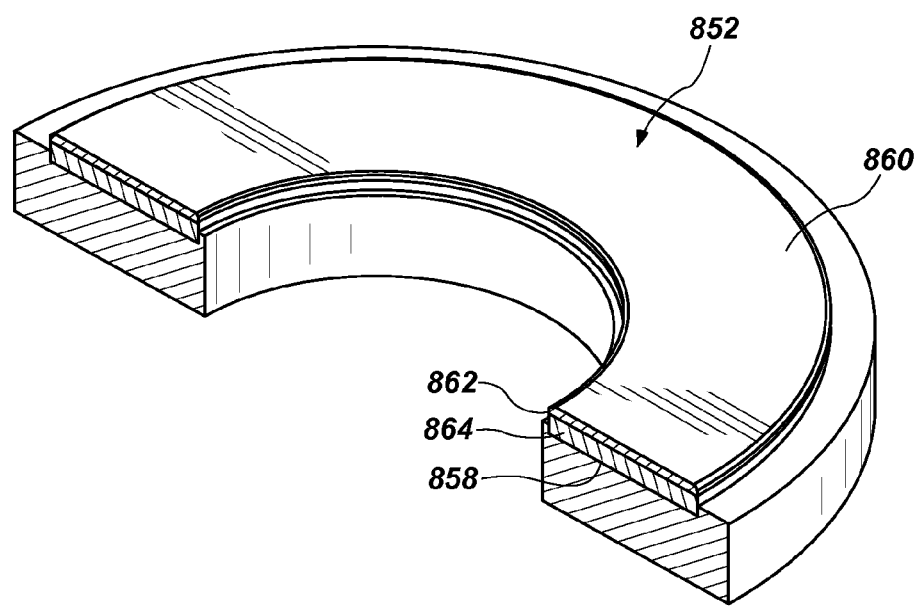
FIG. 8B is an isometric partial cross-sectional view taken along line 8B-8B of the thrust-bearing assembly shown in FIG. 8A.

FIGS. 8A and 8B are isometric and isometric partial cross-sectional views, respectively, of an embodiment of a thrust-bearing assembly 800 that may also be employed as a runner in a thrust-bearing apparatus for use with any of the thrust-bearing assemblies including tilt pads disclosed herein such as the thrust-bearing assembly 100. The thrust-bearing assembly 800 includes a support ring 856 and a continuous bearing element 852 having a continuous bearing surface 860 that is sized sufficiently wide enough to oppose both the tilting pads of another thrust-bearing assembly such as the tilting pads 102 and sliding superhard bearing elements 104. The support ring 856 includes one or more annular slots 858 configured to receive the continuous bearing element 852 and the support ring 856 may be formed using any of the materials disclosed herein with respect to the first support ring 108. In the illustrated embodiment, the support ring 856 only receives a single continuous bearing element 852. The continuous bearing element 852 may be secured to the support ring 856 using any attachment technique disclosed herein. Additionally, the continuous bearing element 852 may be formed using any of the superhard and non-superhard materials discussed herein. For example, the continuous bearing element 852 may be formed of a superhard table 862 (e.g., an at least partially leached PCD table) bonded to a substrate 864. In an embodiment, the continuous bearing element 852 may generally face and be configured to contact (e.g., directly or indirectly through a fluid) the tilting pads of the opposing bearing assembly, such as the titling pads 102 shown in FIGS. 1A and 1B.

The illustrated embodiment may improve wear performance compared to a bearing assembly in which the overall bearing surface is formed of a plurality of segmented, discontinuous bearing surfaces (see FIG. 7) or partially formed from a plurality of sliding superhard bearing elements (see FIGS. 6A and 6B). Wear performance may be improved because the absence of any discontinuities in the overall bearing surface may minimize and/or prevent chipping and/or cracking of the continuous bearing surface 860, promote fluid film development and/or prevent fluid from leaking through seams formed between adjacent superhard bearing segments, or combinations thereof. However, certain production limitations may prevent the use of the continuous bearing element 852 formed from superhard materials.

Any of the above-described embodiments may be employed in a thrust-bearing apparatus. For example, a thrust-bearing apparatus may include a rotor configured similar to the thrust-bearing assembly 600 (e.g., any thrust-bearing assembly described herein including a continuous bearing element and, optionally, a plurality of superhard bearing elements) and a stator configured similar to the thrust-bearing assembly 100 (e.g., any thrust-bearing assembly described herein including a plurality of tilting pads and a plurality of sliding superhard bearing elements). Alternatively, the rotor may be configured similar to the thrust-bearing assembly 100 and the stator may be configured similar to the thrust-bearing assembly 600.

Figure 9:
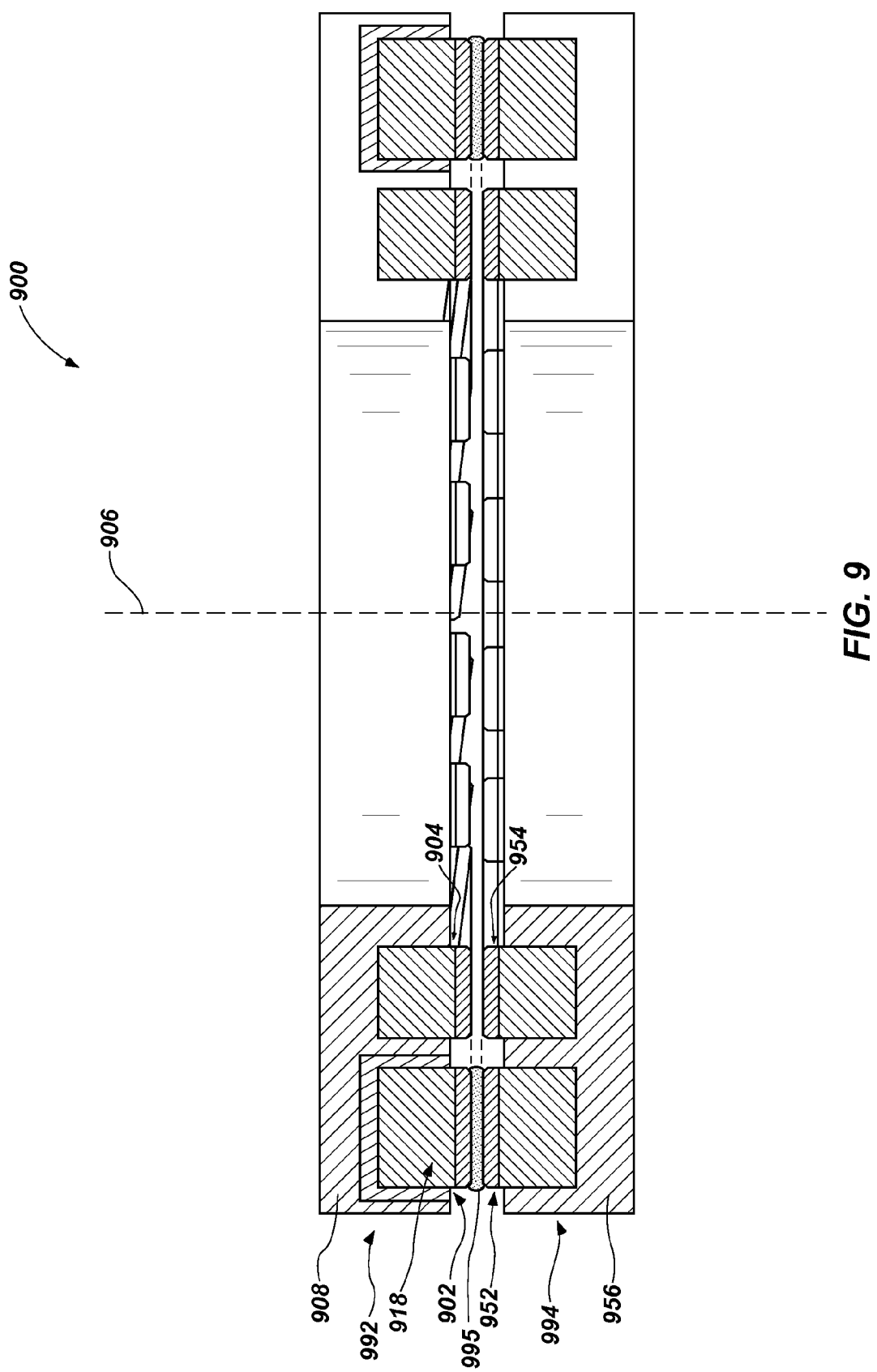
FIG. 9 is a side cross-sectional view of a thrust-bearing apparatus including a rotor and a stator, with a fluid film therebetween according to an embodiment.

FIG. 9 is a side cross-sectional schematic representation of an embodiment of a thrust-bearing apparatus 900 including a stator and a rotor during use. One of the bearing assemblies may be a stator 992, while the other bearing assembly may be a rotor 994, or vice versa. In an embodiment, the stator 992 may include a plurality of tilting pads 902 and a first plurality of sliding superhard bearing elements 904. Meanwhile, the rotor 994 may include a continuous bearing element 952 and, optionally, a second plurality of sliding superhard bearing elements 954. The stator 992 and rotor 994 may be configured similar to any of the embodiments of bearing assemblies disclosed herein. The terms "rotor" and "stator" refer to rotating and stationary components of the thrust-bearing apparatus 900, respectively, although the rotating and stationary status of the illustrated embodiments may also be reversed, as mentioned above. The thrust-bearing assemblies of the thrust-bearing apparatus 900 may exhibit a passive configuration or an active configuration, as discussed above.

The stator 992 may be configured in any suitable manner, including in accordance with embodiments described herein. The stator 992 may include a support ring 908. The tilting pads 902 may be tiltably secured to the support ring 908 and the first plurality of sliding superhard bearing elements 904 may be mounted, brazed, press-fitted or otherwise attached to the support ring 908. Each of the tilting pads 902 may be fixed at a particular tilt (e.g., by brazing), may be manually adjusted to exhibit a particular tilt, may self-establish at a particular tilt, or may be otherwise configured. Each of the first plurality of sliding superhard bearing elements 904 may be mounted to the support ring 908 by brazing, press-fitting, fastening with a fastener, using a high temperature adhesive or another suitable method. Each of the tilting pads 902 may include a superhard bearing element 918. Each of the tilting pads 902 and the first plurality of sliding superhard bearing elements 904 may be formed of any of the superhard materials disclosed herein with respect to the superhard bearing elements 118.

The rotor 994 may be configured in any suitable manner, including in accordance with embodiments disclosed herein. The rotor 994 may include a continuous bearing element 952 and, optionally, a second plurality of sliding superhard bearing elements secured to a support ring 956. The continuous bearing element 952 and each of the second plurality of sliding superhard bearing elements 954 may be mounted or otherwise attached to the support ring 956 by brazing, press-fitting, fastening with a fastener, using a high temperature adhesive or another suitable method. The continuous bearing element 952 of the rotor 994 may generally face and be configured to contact (i.e., directly or indirectly through a fluid), at minimum, the tilting pads 902 of the stator 992.

A fluid film 995 may develop between the continuous bearing element 952 and the superhard bearing element 918 of the tilting pads 902 at relatively high rotational speeds and sufficiently low thrust loads such that the tilting pads 902 and the continuous bearing element 952 support at least a majority of the load. At relatively low rotational speeds, the first plurality of sliding superhard bearing elements 904 and, optionally, the second plurality of sliding superhard bearing elements 954 may contact each other and support at least a portion of the load. In some embodiments, a fluid film may form between first plurality of sliding superhard bearing elements 904 and, optionally, the second plurality of sliding superhard bearing elements 954 at low rotational speeds.

A shaft (not shown for clarity) may be coupled to the support ring 956 and operably coupled to an apparatus capable of rotating the shaft. For example, the shaft may extend through and may be secured to the support ring 956 of the rotor 994 by press-fitting, a threaded connection that couples the shaft to the support ring 956, or by using another suitable technique. A housing (not shown for clarity) may be secured to the support ring 908 of the stator 992 by, for example, press-fitting or threadedly coupling the housing to the support ring 908, and may extend circumferentially about the shaft, the stator 992, and the rotor 994.

In operation, lubrication, drilling fluid, mud, or some other fluid may be pumped between the shaft and the housing, and between the tilting pads 902 of the stator 992 and the continuous bearing element 952 of the rotor 994. More particularly, rotation of the rotor 994 at relatively high rotational speeds may sweep or cause the fluid onto/over superhard bearing elements 918 of the tilting pads 902 and may allow the fluid film 995 to develop between the continuous bearing element 952 and the tilting pads 902. At relatively low rotational speeds, the fluid may reduce the friction between bearing elements and may conduct at least some heat from bearing elements. Additionally, some of the first and second plurality of sliding superhard bearing elements 904 and 954 may influence the flow of the fluid at both relatively high and low rotational speeds.

In an embodiment, the tilting pads 902 may be positioned at a fixed tilt angle or at a configurable or self-establishing tilt angle. The tilting pads 902 of the stator 992 may have a leading edge at a different position than a trailing edge relative to the rotor 994. For example, the tilting pads 902 may be tilted such that a greater separation exists between the tilting pads 902 and the continuous bearing element 952 at a leading edge than at a trailing edge. Under such circumstances, the fluid film 995 may have a variable thickness across the tilting pad 902. In this particular embodiment, a higher fluid film thickness may exist at the leading edge than at the trailing edge.

Under certain operational conditions, the pressure of the fluid film 995 may be sufficient to substantially prevent or reduce contact between the continuous bearing element 952 and the tilting pads 902 and, thus, may substantially reduce the wear on the continuous bearing element 952 and the superhard bearing elements 918 of the tilting pads 902. During relatively low rotational speeds, the pressure of the fluid film 995 may not be sufficient to substantially prevent the continuous bearing element 952 and the superhard bearing elements 918 of the tilting pads 902 from contacting each other. As such, the first plurality of sliding superhard bearing elements 904 are designed to contact either the continuous bearing element 952 or, optionally, the second plurality of sliding superhard bearing elements 954 at relatively low rotational speeds and thereby, support at least a portion of the load. Under such operational conditions, the thrust-bearing apparatus 900 is not operated as a hydrodynamic bearing apparatus, but instead operates as a sliding bearing apparatus. For this reason, the superhard bearing elements 918 of the plurality of tilting pads 902, the continuous bearing element 952, and the first plurality of sliding superhard bearing elements 904 and 954 may be formed of superhard materials that are sufficiently wear resistant to accommodate repetitive contact with each other, such as during start-up and shut-down of a system employing the thrust-bearing apparatus 900 or during relatively low rotational speeds.

In an embodiment, one or more of the plurality of tilting pads 902, one or more of the first plurality of sliding superhard bearing elements 904, one or more of the second plurality of sliding superhard bearing elements 954, or the continuous bearing element 952 may be formed from different materials. For example, at least one bearing surface of the rotor 994 may be formed from any of the reaction-bonded ceramics disclosed herein (e.g., reaction-bonded silicon carbide or reaction-bonded silicon nitride) and at least one bearing surface of the stator 992 may be formed from a PDC. Because the superhard bearing surface bearing elements may include different materials, a non-diamond bearing surface may wear preferentially relative to the wear of a polycrystalline diamond bearing surface. Providing such a bearing apparatus including bearing surfaces formed of different materials may provide for better heat transfer and better maintenance of the fluid film 995 between the superhard bearing surfaces of the continuous bearing element 952 and the superhard bearing elements 918 of the tilting pads 902 than if all the superhard bearing surfaces included the same non-diamond superhard material (e.g., all bearing surfaces include silicon carbide).

Polycrystalline diamond and reaction-bonded ceramics containing diamond particles may have substantially higher thermal conductivity than superhard carbides, such as silicon carbide, reaction-bonded ceramics, or tungsten carbide. Because at least one superhard bearing surface includes polycrystalline diamond or reaction-bonded ceramics containing diamond particles, heat generated during operation (e.g., at least one non-diamond bearing surfaces) may preferentially dissipate as a result of its proximity or contact with polycrystalline diamond bearing surfaces. Thus, a bearing apparatus including at least one bearing surface formed of polycrystalline diamond or reaction-bonded ceramics containing diamond particles bearing surfaces may provide increased wear resistance as compared to a bearing apparatus in which all the bearing surfaces include a non-diamond superhard materials (e.g., silicon carbide), but may be at a lower cost than would be associated with a bearing apparatus in which all of the bearing surfaces include polycrystalline diamond.

In an embodiment, at least one superhard bearing element of the stator 992 may include at least one non-diamond superhard bearing surface. Meanwhile the rotor 994 may include a superhard bearing element formed of PCD. In some application or uses, the stator 992 within the thrust-bearing apparatus 900 may fails before the rotor 994. In some examples, this may occur because the bearing surfaces of the stator 992 are often subjected to unequal heating and wear. For example, wear on the stator 992 is often unequal because a small number of stator 992 bearing elements may be somewhat more "prominent" than the other bearing elements of the stator 992. As a result, contact, heating, and wear during use (at least initially) may be preferentially associated with these more prominent bearing elements of the stator 992. For example, the bulk of the load and resulting wear may be borne by, for example, the one to three most prominent bearing elements, while the other bearing elements of the stator 992 may show little wear by comparison. Such wear may result from the difficulty of perfectly aligning and/or loading the bearing elements of the bearing assembly.

In an embodiment, the bearing elements of the stator 992 may not include polycrystalline diamond, but may include a non-diamond superhard material. In such an embodiment, the stator 992 may be replaced once failure or a given degree of wear occurs. In another embodiment, the stator 992 may include at least one polycrystalline diamond bearing surface, one or more polycrystalline diamond bearing surface, or the stator 992 may be solely polycrystalline diamond bearing surfaces, and the rotor 994 may not include a diamond bearing surface. It is currently believed that having at least one polycrystalline diamond surface and at least one non-polycrystalline diamond surface facilitates faster breaking in of the bearing surfaces as the less hard bearing surfaces wear/break in relatively faster.

Figure 10A:
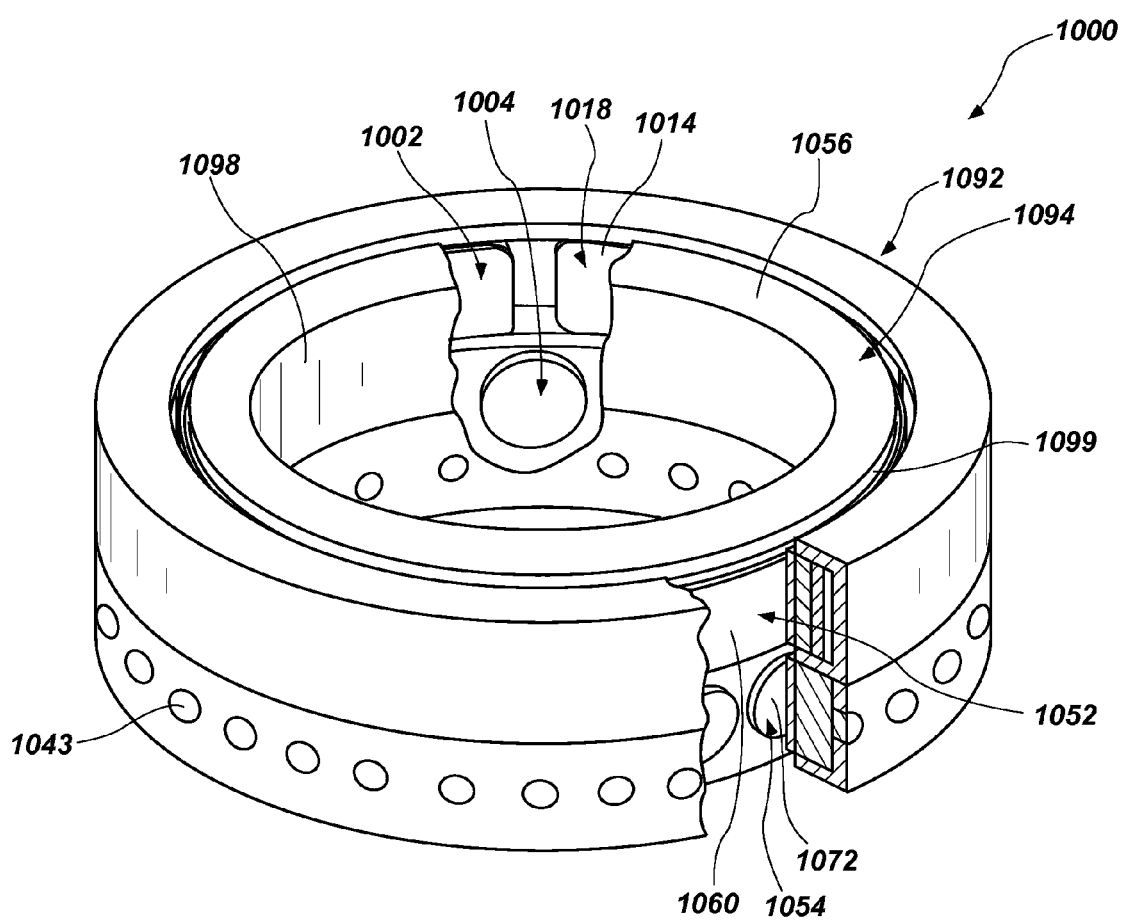
FIG. 10A is an isometric cutaway view of a radial bearing apparatus including a plurality of tilting pads and a first plurality of superhard bearing elements according to an embodiment.
Figure 10B:
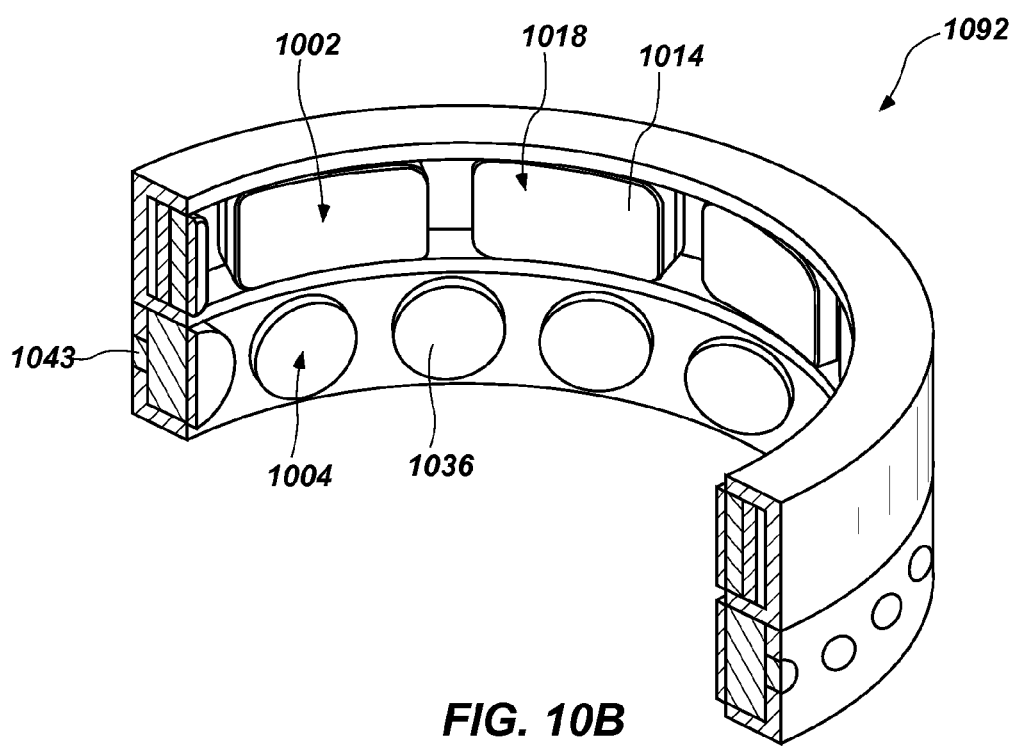
FIG. 10B is an isometric cutaway view of an outer race including a plurality of tilting pads and a first plurality of superhard bearing elements according to an embodiment.
Figure 10C:
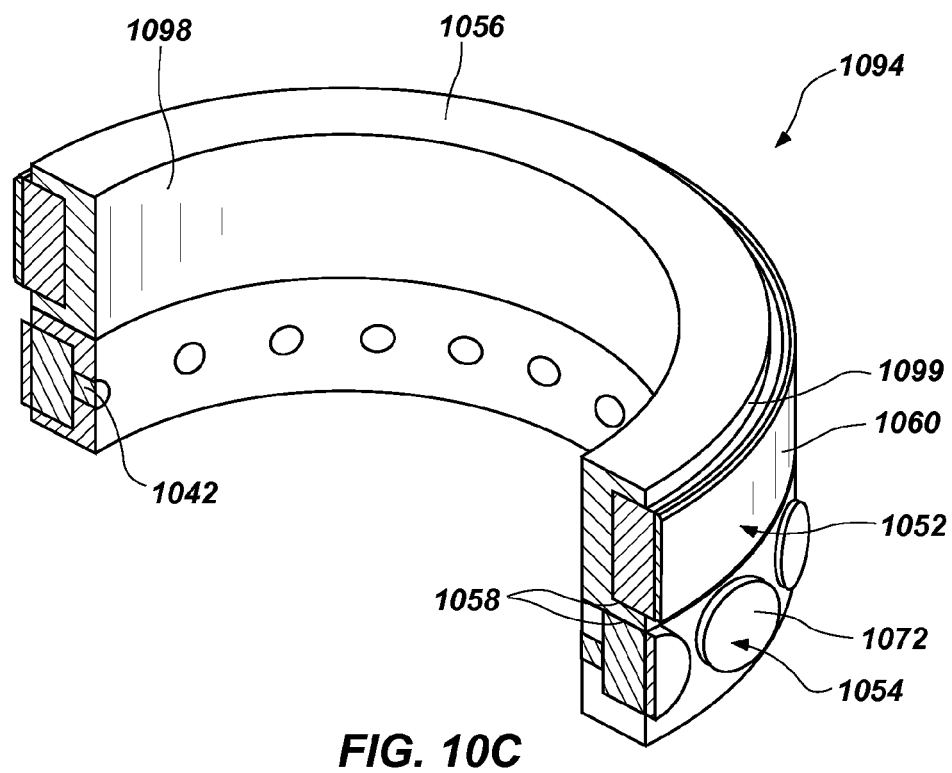
FIG. 10C is an isometric cutaway view of an inner race including a continuous bearing element and a second plurality of superhard bearing elements according to an embodiment.

The concepts used in the thrust-bearing assemblies and apparatuses described herein may also be employed in radial bearing assemblies and apparatuses. FIG. 10A is an isometric view of an embodiment of a radial bearing apparatus 1000 and FIGS. 10B and 10C are isometric cutaway views of an outer race 1092 and an inner race 1094 of the radial bearing apparatus 1000, respectively, according to one or more embodiments. The inner race 1094 (e.g., a rotor) of the radial bearing apparatus 1000 is received concentrically by the outer race 1092 (e.g., a stator) of the radial bearing apparatus 1000. The terms "rotor" and "stator" refer to rotating and stationary components of the radial bearing system, respectively. Thus, if the inner race is configured to remain stationary, the inner race may be referred to as the stator and the outer race may be referred to as the rotor.

The inner race 1094 (e.g., a rotor) may have an interior surface 1098 defining a hole for receiving a shaft or other component. The inner race 1094 also includes a support ring 1056 including one or more recesses 1058 (e.g., annular slots) that receive a continuous bearing element 1052. Optionally, the support ring 1056 may additionally include one or more rows of recesses 1059 each of which receives a first plurality of sliding superhard bearing elements 1054. The continuous bearing element 1052 and the first plurality of sliding superhard bearing elements 1054 may be secured to the support ring 1056 by brazing, press-fitting, using fasteners, or another suitable technique. The continuous bearing element 1052 and the first plurality of sliding superhard bearing elements 1054 may be positioned at or near an exterior surface 1099 of the inner race 1094. The continuous bearing element 1052 and the first plurality of sliding superhard bearing elements 1054 and convexly-curved superhard bearing surfaces 1060 and 1072 thereof may be formed from any materials (e.g., superhard materials, metals, ceramics, etc.) disclosed herein with respect to the superhard bearing element 118.

In the illustrated configuration, the inner race 1094 may exhibit an active configuration that is configured to displace at least one, some, or each of the first plurality of sliding superhard bearing elements 1054 radially inwardly and outwardly according to a sensor (e.g., force sensor, rotation sensor, another sensor, or combinations thereof) (not shown). For example, at least one, some, or each of the first plurality of sliding superhard bearing elements 1054 may be selectively displaced radially inwardly and outwardly via one or more actuators 1042. For example, the one or more actuators 1042 may be selected from any of the actuators discussed above with respect to FIG. 2B. However, in other embodiments, the actuators 1042 may be omitted and the inner race 1094 may be passive.

The outer race 1092 include a plurality of circumferentially-spaced tilting pads 1002 and a second plurality of sliding superhard bearing elements 1004. Each of the tilting pads 1002 may include a superhard bearing element 1018. Each of the tilting pads 1002 and the second plurality of sliding superhard bearing elements 1004 may be formed from any superhard materials disclosed herein with respect to the superhard bearing element 118. The tilting pads may comprise materials other than superhard materials such as metals, ceramics, etc. In an embodiment, the bearing surfaces 1014 of the superhard bearing elements 1018 of the tilting pads 1002 may be substantially planar, although in other embodiments the bearing surfaces may be a concavely-curved to generally correspond to shapes of the convexly-curved continuous bearing surface 1060 of the continuous bearing element 1052 and, optionally, sliding superhard bearing surfaces 1072 of the first plurality of sliding superhard bearing elements 1054 of the inner race 1054, respectively.

In the illustrated embodiment, the outer race 1092 may exhibit an active configuration that is configured to selectively displace the second plurality of sliding superhard bearing elements 1004 radially inwardly and outwardly according to a measurement from at least one sensor (e.g., a force sensor, a rotation sensor, another sensor, or combinations thereof) (not shown). For example, at least one, some, or each of the second plurality of sliding superhard bearing elements 1004 may be selectively displaced radially inwardly and outwardly via one or more actuators 1043. For example, the one or more actuators 1043 may be selected from any of the actuators discussed above with respect to FIG. 2B. However, in other embodiments, the actuators 1043 may be omitted.

In operation, rotation of a shaft (not shown) secured to the inner race 1094 may rotate the inner race 1094 relative to the outer race 1092. Drilling fluid, lubrication or other fluid may be pumped between or in contact with the superhard bearing surfaces of the inner race 1094 and the superhard bearing surfaces of the outer race 1092. When the inner race 1094 rotates, the leading edge sections of the tilting pads 1002 may sweep or move lubricant (e.g., drilling fluid or other lubricant) onto the surface of the superhard bearing elements 1018 of the tilting pads 1002. Further, each superhard bearing element 1018 of the tilting pads 1002 may be tilted relative to an imaginary cylindrical surface. At relatively high rotational speeds, a fluid film may at least partially develop between the superhard bearing elements 1018 of the tilting pads 1002 and the continuous bearing element 1052, and may develop sufficient pressure to maintain the superhard bearing elements 1018 of the tilting pads 1002 and the continuous bearing element 1052 apart from each other. Alternatively, at relatively high rotational speeds, a partial fluid film may develop between the superhard bearing elements 1018 of the tilting pads 1002 and the continuous bearing element 1052. At relatively low rotational speeds, the second plurality of sliding superhard bearing elements 1004 contacts either the continuous bearing element 1052 or, optionally, the first plurality of sliding superhard bearing elements 1054 and thereby supports at least a portion of the load. Accordingly, wear on the superhard bearing elements 1018 of the tilting pads 1002 and continuous bearing element 1052 may be reduced relative to direct contact between the superhard bearing elements 1018 of the tilting pads 1002 and continuous bearing element 1052.

Each tilting pad 1002 may be tilted in a manner that facilitates/allows sweeping in of the lubricant or other fluid to form a fluid film between the inner race 1094 and the outer race 1092. Each tilting pad 1002 may be tilted and/or tilt about an axis that is generally parallel to the axis (not shown for clarity). For example, each tilting pad 1002 may be tilted at an angle relative to the inner and outer surfaces of the support ring 1008 and in a circumferential fashion such that the leading edges of the tilting pads 1002 are about parallel to the axis. The leading edge may help to sweep/allow lubricant or another fluid onto the surfaces of the superhard bearing elements 1018 of the tilting pads 1002 to form a fluid film (e.g., similar to the tilting pads 802 shown in FIG. 8). More particularly, when the inner race 1094 is concentrically positioned relative to the outer race 1092, the leading edges may be offset relative to the outer edge of the outer race 1092, and by a distance that is larger than a distance between the outer race 1092 and a trailing edge of the superhard bearing surface 1014 of the tilting pads 1002. It should be noted that in other embodiments, the radial bearing apparatus may be configured as a journal bearing. In such an embodiment, the inner race 1094 may be positioned eccentrically relative to the outer race 1092.

In some embodiments, one or more of the superhard bearing elements 1018 of the tilting pads 1002, the continuous bearing element 1052, the first plurality of sliding superhard bearing elements 1004, or the second plurality of sliding superhard bearing elements 1054 may be formed from a plurality of superhard bearing segments (not shown). Each superhard bearing segment may be substantially identical, or the superhard bearing segments may be different relative to other of the superhard bearing segments. In some embodiments, the superhard bearing segments each include a superhard table bonded to a substrate. Optionally, the substrate may be connected or supported relative to a support plate, the support ring, or other material or component. Additionally, seams (not shown) may be formed between circumferentially and/or longitudinally adjacent to the superhard bearing elements. The edges of the superhard bearing segments may have any number of configurations or shapes, and may correspond to or interlock with adjoining edges in any number of different manners. Further, sealant materials may be disposed within a gap that may be formed between adjacent superhard bearing segments to help further prevent fluid leakage through the seams.

Figure 11:
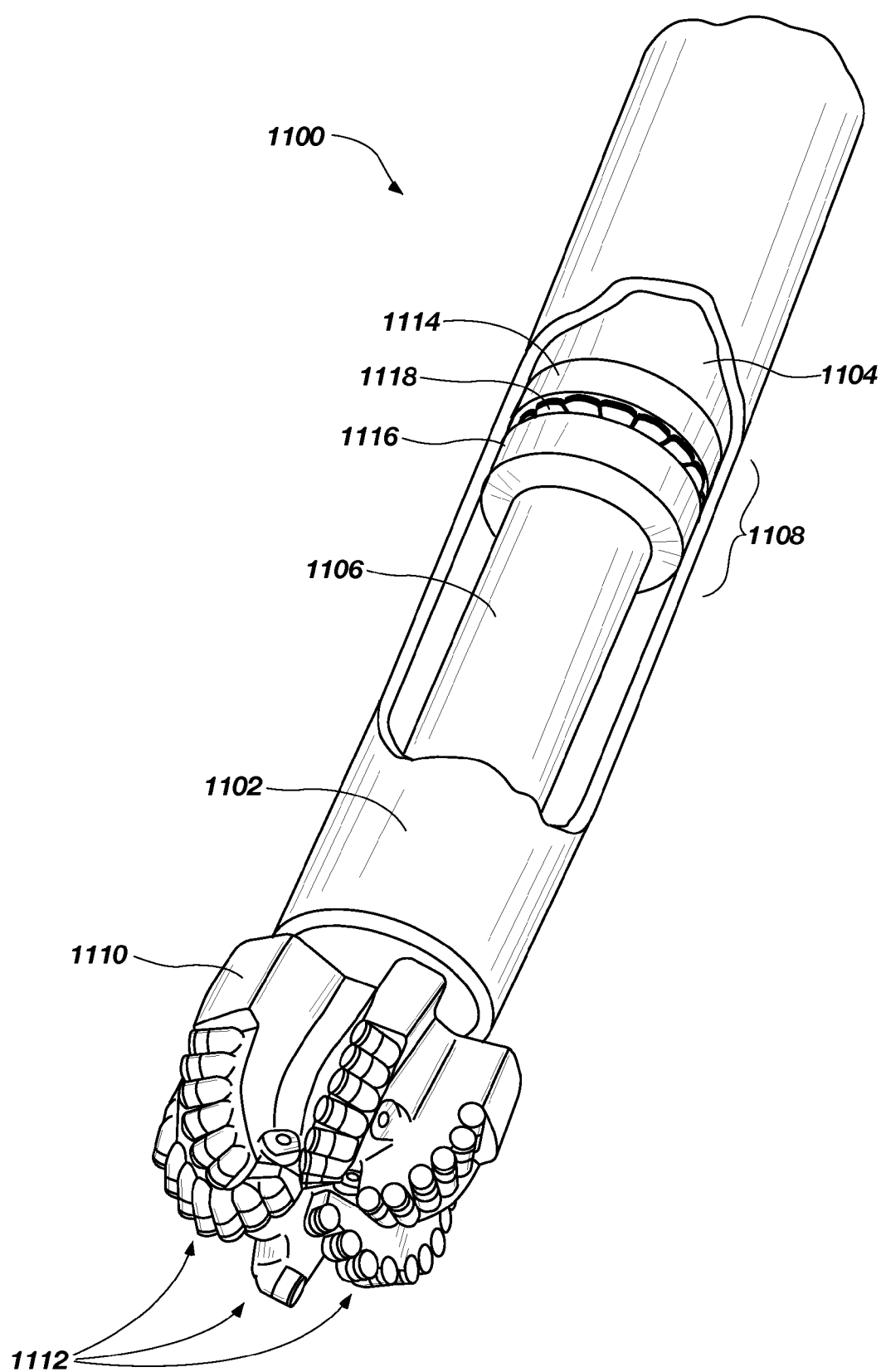
FIG. 11 is a schematic isometric cutaway view of a subterranean drilling system that may employ any of the disclosed bearing apparatuses according to an embodiment.

Any of the embodiments for bearing apparatuses discussed above may be used in a subterranean drilling system. FIG. 11 is a schematic isometric cutaway view of an embodiment of a subterranean drilling system 1100 according to an embodiment that uses a thrust-bearing apparatus. The subterranean drilling system 1100 includes a housing 1102 enclosing a downhole drilling motor 1104 (i.e., a motor, turbine, or any other device capable of rotating an output shaft) that is operably connected to an output shaft 1106. A thrust-bearing apparatus 1108 is operably coupled to the downhole drilling motor 1104. The thrust-bearing apparatus 1108 may be configured as any of the previously described thrust-bearing apparatus embodiments. A rotary drill bit 1110 configured to engage a subterranean formation and drill a borehole is connected to the output shaft 1106. The rotary drill bit 1110 is shown as so-called "fixed cutter"

drill bit including a plurality of blades having a plurality of PDC cutting elements 1112 mounted thereon. However, in other embodiments, the rotary drill bit 1110 may be configured as a roller cone bit including a plurality of roller cones.

The thrust-bearing apparatus 1108 includes a stator 1114 that does not rotate and a rotor 1116 that is attached to the output shaft 1106 and rotates with the output shaft 1106. The stator 1114 may include a plurality of circumferentially spaced tilting pads bearing segments 1118 and a first plurality of sliding superhard bearing elements secured using retention elements (e.g., brazing, press-fitting, pins, interference-fit pins, threaded fasteners, etc.), as previously described such as with respect to the thrust-bearing assemblies shown in FIGS. 1 to 2B. The rotor 1116 may include a continuous bearing element and, optionally, a second plurality of sliding superhard bearing elements such as shown in the thrust-bearing assemblies shown in FIGS. 6-8.

In operation, drilling fluid may be circulated through the downhole drilling motor 1104 to generate torque and effect rotation of the output shaft 1106 and the rotary drill bit 1110 attached thereto so that a borehole may be drilled. A portion of the drilling fluid is also used to lubricate opposing bearing surfaces of the stator 1114 and rotor 1116. As the borehole is drilled, pipe sections may be connected to the subterranean drilling system 1100 to form a drill string capable of progressively drilling the borehole to a greater depth within the earth.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall be open ended and have the same meaning as the word "comprising."

The invention claimed is:

1. A bearing assembly, comprising:
a support ring having a bearing face;
a plurality of tilting pads distributed circumferentially about an axis, wherein each of the plurality of tilting pads includes a substantially planar bearing surface and is tiltably secured to the support ring; and
a plurality of sliding superhard bearing elements distributed circumferentially about the axis and spaced from the plurality of tilting pads, wherein each of the plurality of sliding superhard bearing elements includes a superhard, substantially planar bearing surface and is brazed to the support ring.

2. The bearing assembly of claim 1 wherein at least one of the plurality of tilting pads or at least one of the plurality of sliding superhard bearing elements includes at least one of silicon carbide, silicon nitride, a reaction bonded ceramic, a carbide, boron nitride, or polycrystalline diamond.

3. The bearing assembly of claim 1 wherein at least one of the plurality of tilting pads or at least one of the plurality of sliding superhard bearing elements includes a superhard table bonded to a substrate.

4. The bearing assembly of claim 1 wherein at least one of the plurality of titling pads or the plurality of sliding superhard bearing elements are arranged in two or more radially spaced rows.

5. The bearing assembly of claim 1 wherein the superhard bearing surfaces of the plurality of sliding superhard bearing elements are positioned farther from the bearing face of the support ring than bearing surfaces of the plurality of tilting pads when the plurality of tilting pads are not tilted.

6. The bearing assembly of claim 1 wherein the superhard bearing surfaces of the plurality of sliding superhard bearing elements are spaced from the bearing face of the support ring a distance that is substantially the same as the bearing surfaces of the plurality of tilting pads such that the superhard bearing surfaces of the sliding superhard bearing elements are substantially coplanar with the bearing surfaces of the plurality of tilting pads when the plurality of tilting pads are not tilted.

7. The bearing assembly of claim 1 further comprising one or more sensors configured to measure an operating conditions of the bearing assembly during use.

8. The bearing assembly of claim 1 wherein the plurality of sliding superhard bearing elements are radially spaced from the plurality of tilting pads.

9. The bearing assembly of claim 1 wherein the plurality of sliding superhard bearing elements are distributed in the same row as the plurality of tilting pads.

10. A bearing assembly, comprising:
a support ring;
a plurality of tilting pads distributed circumferentially about an axis, wherein each of the plurality of tilting pads is tiltably secured to the support ring;
a plurality of sliding superhard bearing elements distributed circumferentially about the axis and radially spaced from the plurality of tilting pads, wherein each of the plurality of sliding superhard bearing elements includes a superhard bearing surface and is secured to the support ring;
at least one actuator positioned and configured to raise or lower at least one of the plurality of sliding superhard bearing elements.

11. A bearing assembly, comprising:
a support ring;
a substantially continuous bearing element extending about an axis, wherein the substantially continuous bearing element is secured to the support ring; and
a plurality of sliding superhard bearing elements distributed circumferentially about the axis and radially spaced from the substantially continuous bearing element, each of the plurality of sliding superhard bearing elements including a superhard bearing surface, wherein each of the plurality of sliding superhard bearing elements is secured to the support ring;
wherein the superhard bearing surfaces of the plurality of sliding superhard bearing elements are positioned a first distance from the support ring and a bearing surface of the substantially continuous bearing element is positioned a second distance from the support ring, the first distance being different than the second distance.

12. The bearing assembly of claim 11 wherein at least one of the substantially continuous bearing element or at least one of the plurality of sliding superhard bearing elements includes a bearing surface including at least one of silicon carbide, silicon nitride, a reaction bonded superhard ceramic, a carbide, boron nitride, or polycrystalline diamond.

13. The bearing assembly of claim 11 wherein at least one of the substantially continuous bearing element or at least one of the plurality of sliding superhard bearing elements includes a superhard bearing table bonded to a substrate.

14. The bearing assembly of claim 11 wherein the first distance is greater than the second distance.

15. The bearing assembly of claim 11 wherein at least one of the substantially continuous bearing element or the plurality of sliding superhard bearing elements is arranged in two or more radially spaced rows.

16. The bearing assembly of claim 11 further comprising at least one actuator positioned and configured to move at least one of the plurality of sliding superhard bearing elements.

17. The bearing assembly of claim 11 further comprising one or more sensors configured to measure at least one of a force exerted on the plurality of sliding superhard bearing elements or a rotational speed of the bearing assembly.

18. A bearing apparatus, comprising:
a first bearing assembly including:
a first support ring;
a plurality of tilting pads distributed circumferentially about an axis, each of the plurality of tilting pads includes a bearing element having a bearing surface, each of the plurality of tilting pads is tiltably secured to the first support ring; and
a first plurality of sliding superhard bearing elements distributed circumferentially about the axis, each of the first plurality of sliding superhard bearing elements includes a superhard bearing surface, each of the first plurality of sliding superhard bearing elements is secured to the first support ring; and
a second bearing assembly including:
a second support ring;
a substantially continuous bearing element secured to the second support ring, the substantially continuous bearing element including a substantially continuous bearing surface that generally faces the superhard bearing surfaces of the plurality of titling pads; and
a second plurality of sliding superhard bearing elements secured to the second bearing assembly that generally face the first plurality of sliding bearing elements.

19. The bearing apparatus of claim 18 wherein the plurality of sliding superhard bearing elements are configured to support a portion of a load at a first rotational speed carried by the first bearing assembly, and wherein the plurality of titling pads are configured to support at least a majority of the load carried by the first bearing assembly at a second rotational speed that is greater than the first rotational speed.

20. The bearing apparatus of claim 18 wherein the substantially continuous bearing element comprises polycrystalline diamond.

21. The bearing apparatus of claim 18 wherein the substantially continuous bearing element of the second bearing assembly is configured to generally face the bearing surfaces of the plurality of tilting pads and the superhard bearing surfaces of the first plurality of sliding superhard bearing elements.

22. The bearing apparatus of claim 18, wherein the substantially continuous bearing element comprises at least one of a silicon carbide and a metal.

23. The bearing apparatus of claim 22, wherein at least one tilting pad of the plurality of titling pads comprises polycrystalline diamond.

24. The bearing apparatus of claim 22, wherein at least one sliding superhard bearing element of the plurality of sliding superhard bearing elements comprises polycrystalline diamond.

25. The bearing apparatus of claim 18, wherein at least one of the substantially continuous bearing element or at least one of the plurality of sliding superhard bearing elements includes a bearing surface including at least one of silicon carbide, silicon nitride, a reaction bonded superhard ceramic, a carbide, boron nitride, or polycrystalline diamond.

26. The bearing apparatus of claim 18, wherein at least one sliding superhard bearing element of the plurality of sliding superhard bearing elements exhibits a substantially cylindrical configuration.

27. The bearing apparatus of claim 18, wherein the superhard bearing surfaces of the second plurality of sliding superhard bearing elements are positioned a first distance from the second support ring and the substantially continuous bearing surface of the substantially continuous bearing element is positioned a second distance from the second support ring, the first distance being different than the second distance.

28. The bearing apparatus of claim 18, wherein the superhard bearing surfaces of the first plurality of sliding superhard bearing elements are positioned a first distance from the first support ring and the bearing surfaces of the plurality of tilting pads are positioned a second distance from the first support ring the plurality of tilting pads are not tilted.

29. The bearing apparatus of claim 18, wherein at least one of the substantially continuous bearing element or at least one of the plurality of sliding superhard bearing elements includes a bearing surface including polycrystalline diamond, wherein at least a portion of the polycrystalline diamond is leached to form a metal-solvent depleted region.

30. A method of operating a bearing apparatus, the method comprising:
providing a first bearing assembly including:
a first support ring;
a plurality of tilting pads distributed circumferentially about an axis, wherein each of the plurality of tilting pads is tiltably secured to the first support ring; and
a plurality of sliding superhard bearing elements distributed circumferentially about the axis, wherein each of the plurality of sliding superhard bearing elements is secured to the first support ring;
providing a second bearing assembly including:
a second support ring;
a substantially continuous bearing element secured to the second support ring, the substantially continuous bearing element including a superhard bearing surface that generally faces bearing surfaces of the plurality of titling pads; and
rotating one of the first bearing assembly or the second bearing assembly with respect to the other one of the first or second bearing assemblies;
wherein rotating one of the first bearing assembly or the second bearing assembly with respect to the other one of the first or second bearing assemblies at a first rotational speed causes the plurality of sliding superhard bearing elements to support substantially all of a load; and
wherein rotating one of the first bearing assembly or the second bearing assembly with respect to the other one of the first or second bearing assemblies at a second rotational speed greater than the first rotational speed causes the plurality of tilting pads to support at least a majority of the load.

31. A method of operating a bearing apparatus, the method comprising:
providing a first bearing assembly including:
a first support ring;
a plurality of tilting pads distributed circumferentially about an axis, wherein each of the plurality of tilting pads is tiltably secured to the first support ring; and a plurality of sliding superhard bearing elements distributed circumferentially about the axis, wherein each of the plurality of sliding superhard bearing elements is secured to the first support ring;

providing a second bearing assembly including:
a second support ring;
a substantially continuous bearing element secured to the second support ring, the substantially continuous bearing element including a superhard bearing surface that generally faces bearing surfaces of the plurality of titling pads; and rotating one of the first bearing assembly or the second bearing assembly with respect to the other one of the first or second bearing assemblies;

wherein rotating one of the first bearing assembly or the second bearing assembly with respect to the other one of the first or second bearing assemblies at a first rotational speed causes the plurality of sliding superhard bearing elements to support at least a portion of a load; and wherein rotating one of the first bearing assembly or the second bearing assembly with respect to the other one of the first or second bearing assemblies at a second rotational speed greater than the first rotational speed causes the plurality of tilting pads to support at least a majority of the load; and wherein the other one of the first or second bearing assemblies includes a second plurality of sliding superhard bearing elements distributed circumferentially about the axis, each of the second plurality of sliding superhard bearing elements is secured to the second support ring.

32. A method of operating a bearing apparatus, the method comprising:

providing a first bearing assembly including:
a first support ring;
a plurality of tilting pads distributed circumferentially about an axis, wherein each of the plurality of tilting pads is tiltably secured to the first support ring; and
a plurality of sliding superhard bearing elements distributed circumferentially about the axis, wherein each of the plurality of sliding superhard bearing elements is secured to the first support ring;

providing a second bearing assembly including:
a second support ring;
a substantially continuous bearing element secured to the second support ring, the substantially continuous bearing element including a superhard bearing surface that generally faces bearing surfaces of the plurality of tilting pads; and rotating one of the first bearing assembly or the second bearing assembly with respect to the other one of the first or second bearing assemblies;

detecting, with a sensor, an operating condition; and responsive to the operating condition, selectively displacing one or more of the plurality of sliding superhard bearing elements;

wherein rotating one of the first bearing assembly or the second bearing assembly with respect to the other one of the first or second bearing assemblies at a first rotational speed causes the plurality of sliding superhard bearing elements to support at least a portion of a load; and wherein rotating one of the first bearing assembly or the second bearing assembly with respect to the other one of the first or second bearing assemblies at a second rotational speed greater than the first rotational speed causes the plurality of tilting pads to support at least a majority of the load.

\* \* \* \* \*